US012585703B2

(12) United States Patent
Xu et al.

(10) Patent No.: US 12,585,703 B2
(45) Date of Patent: Mar. 24, 2026

(54) METHOD AND APPARATUS FOR PROCESSING GRAPH DATA, DEVICE, STORAGE MEDIUM, AND PROGRAM PRODUCT

(71) Applicant: TENCENT TECHNOLOGY (SHENZHEN) COMPANY LTD, Shenzhen (CN)

(72) Inventors: Jie Xu, Shenzhen (CN); Xiaosen Li, Shenzhen (CN); Wen Ouyang, Shenzhen (CN); Pin Xiao, Shenzhen (CN); Yangyu Tao, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 342 days.

(21) Appl. No.: 17/977,881

(22) Filed: Oct. 31, 2022

(65) Prior Publication Data

US 2023/0056760 A1      Feb. 23, 2023

Related U.S. Application Data

(63) Continuation of application No. PCT/CN2022/078206, filed on Feb. 28, 2022.

(30) Foreign Application Priority Data

Mar. 8, 2021    (CN) .......................... 202110248839.7

(51) Int. Cl.
*G06F 16/901* (2019.01)
*G06Q 50/00* (2024.01)

(52) U.S. Cl.
CPC ......... *G06F 16/9024* (2019.01); *G06Q 50/01* (2013.01)

(58) Field of Classification Search
None
See application file for complete search history.

(56) References Cited

U.S. PATENT DOCUMENTS

| | | | |
|---|---|---|---|
| 2014/0067873 A1 | 3/2014 | Rosu et al. | |
| 2016/0246826 A1* | 8/2016 | Lee ....................... | G06F 16/211 |

(Continued)

FOREIGN PATENT DOCUMENTS

| | | |
|---|---|---|
| CN | 106815322 A | 6/2017 |
| CN | 112245937 A | 1/2021 |
| CN | 112597399 A | 4/2021 |

OTHER PUBLICATIONS

Chinese Office Action for 202110248839.7, dated Apr. 14, 2021.
International Search Report for PCT/CN2022/078206, dated May 30, 2022.

*Primary Examiner* — Kannan Shanmugasundaram
(74) *Attorney, Agent, or Firm* — Sughrue Mion, PLLC

(57) ABSTRACT

A graph data processing method includes acquiring a directed graph, where a directed edge in the directed graph is represented as pointing to a destination vertex from a start vertex; representing the directed edge in a unified form according to a specified order between a vertex identifier of the start vertex and a vertex identifier of the destination vertex; generating a tagged edge for recording an original edge direction of the directed edge, to obtain a tagged directed graph; and identifying a category of a triangle constituted by a vertex in the tagged directed graph, a neighbor vertex of the vertex, and a common vertex commonly adjacent to the vertex and the neighbor vertex, based on tagged edges between two of the vertex, the neighbor vertex, and the common vertex.

20 Claims, 12 Drawing Sheets

(56) References Cited

U.S. PATENT DOCUMENTS

| 2020/0082026 | A1* | 3/2020 | Tian | G06F 16/288 |
| 2021/0103844 | A1* | 4/2021 | Tatsumura | G06N 7/01 |

\* cited by examiner

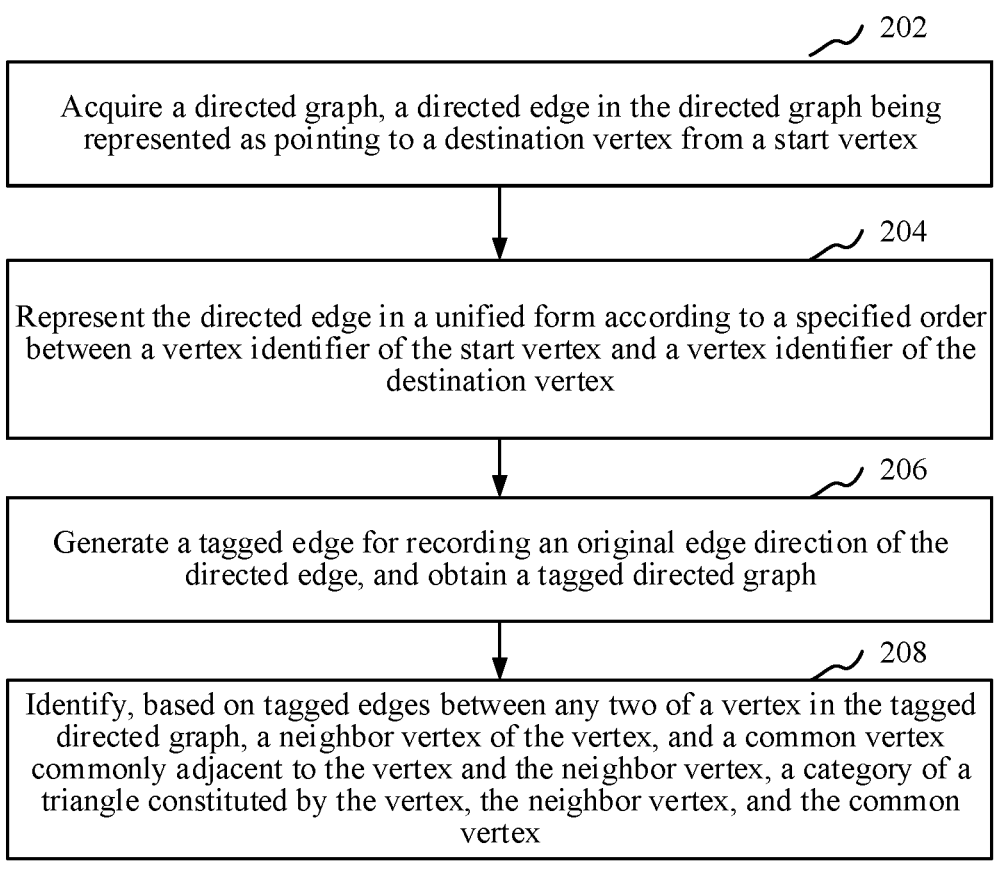

202

Acquire a directed graph, a directed edge in the directed graph being represented as pointing to a destination vertex from a start vertex

204

Represent the directed edge in a unified form according to a specified order between a vertex identifier of the start vertex and a vertex identifier of the destination vertex

206

Generate a tagged edge for recording an original edge direction of the directed edge, and obtain a tagged directed graph

208

Identify, based on tagged edges between any two of a vertex in the tagged directed graph, a neighbor vertex of the vertex, and a common vertex commonly adjacent to the vertex and the neighbor vertex, a category of a triangle constituted by the vertex, the neighbor vertex, and the common vertex

FIG. 2

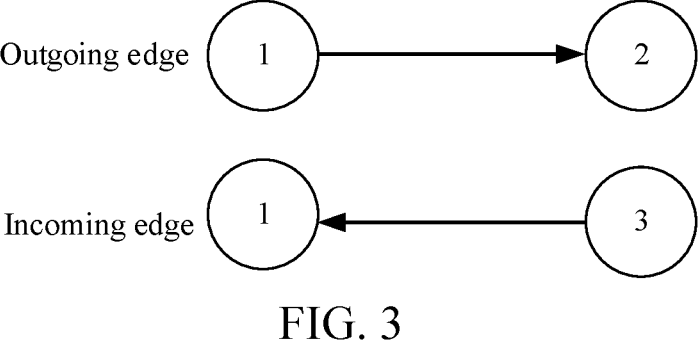

Outgoing edge    1 ——→ 2

Incoming edge    1 ←—— 3

FIG. 3

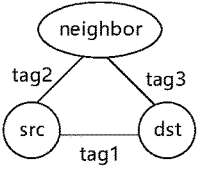

(tag1,tag2,tag3)

| Cycle | Trans | Out-Recip | In-Recip | Trans-Recip | Two-Recip | Three-Recip |
|---|---|---|---|---|---|---|
| ( 0 , 1 , 0 ) | ( 0 , 0 , 0 ) | ( 0 , 0 , 2 ) | ( 0 , 2 , 1 ) | ( 2 , 0 , 1 ) | ( 2 , 2 , 0 ) | ( 2 , 2 , 2 ) |
| ( 1 , 0 , 1 ) | ( 0 , 0 , 1 ) | ( 2 , 1 , 1 ) | ( 2 , 0 , 0 ) | ( 2 , 1 , 0 ) | ( 0 , 2 , 2 ) | |
| | ( 0 , 1 , 1 ) | ( 1 , 2 , 0 ) | ( 1 , 1 , 2 ) | ( 0 , 2 , 0 ) | ( 2 , 0 , 2 ) | |
| | ( 1 , 0 , 0 ) | | | ( 1 , 2 , 1 ) | ( 2 , 2 , 1 ) | |
| | ( 1 , 1 , 0 ) | | | ( 0 , 1 , 2 ) | ( 1 , 2 , 2 ) | |
| | ( 1 , 1 , 1 ) | | | ( 1 , 0 , 2 ) | ( 2 , 1 , 2 ) | |

FIG. 8

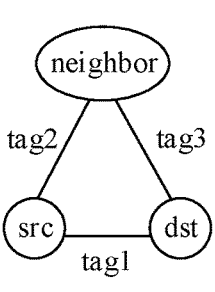

(tag1,tag2,tag3)

| First branch: A quantity of tag which is 2 is 0 | Second branch: A quantity of tag which is 2 is 1 | Third branch: A quantity of tag which is 2 is 2 | Fourth branch: A quantity of tag which is 2 is 3 |
|---|---|---|---|
| Cycle<br><br>( 0 , 1 , 0 )<br>( 1 , 0 , 1 ) | Out-Recip<br><br>( 0 , 0 , 2 )<br>( 2 , 1 , 1 )<br>( 1 , 2 , 0 ) | Two-Recip<br><br>(any , any , any) | Three-Recip<br><br>( 2 , 2 , 2 ) |
| Trans<br><br>(any , any , any) | In-Recip<br><br>( 0 , 2 , 1 )<br>( 2 , 0 , 0 )<br>( 1 , 1 , 2 ) | | |
| | Trans-Recip<br><br>(any , any , any ) | | |

FIG. 9

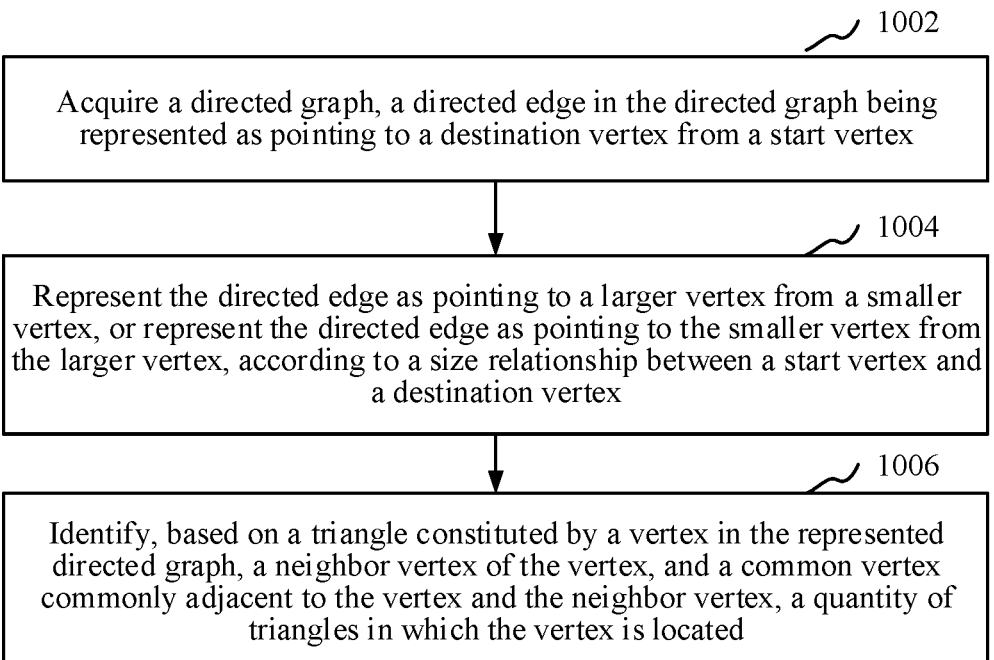

1002

Acquire a directed graph, a directed edge in the directed graph being represented as pointing to a destination vertex from a start vertex

1004

Represent the directed edge as pointing to a larger vertex from a smaller vertex, or represent the directed edge as pointing to the smaller vertex from the larger vertex, according to a size relationship between a start vertex and a destination vertex

1006

Identify, based on a triangle constituted by a vertex in the represented directed graph, a neighbor vertex of the vertex, and a common vertex commonly adjacent to the vertex and the neighbor vertex, a quantity of triangles in which the vertex is located

FIG. 10

(a) Directed graph (b) Original adjacency list (c) Tagged edge (d) Aggregated edge (e) Remove redundant edge (f) Adjacency list (g) Triangle identification (h) Triangle category derivation

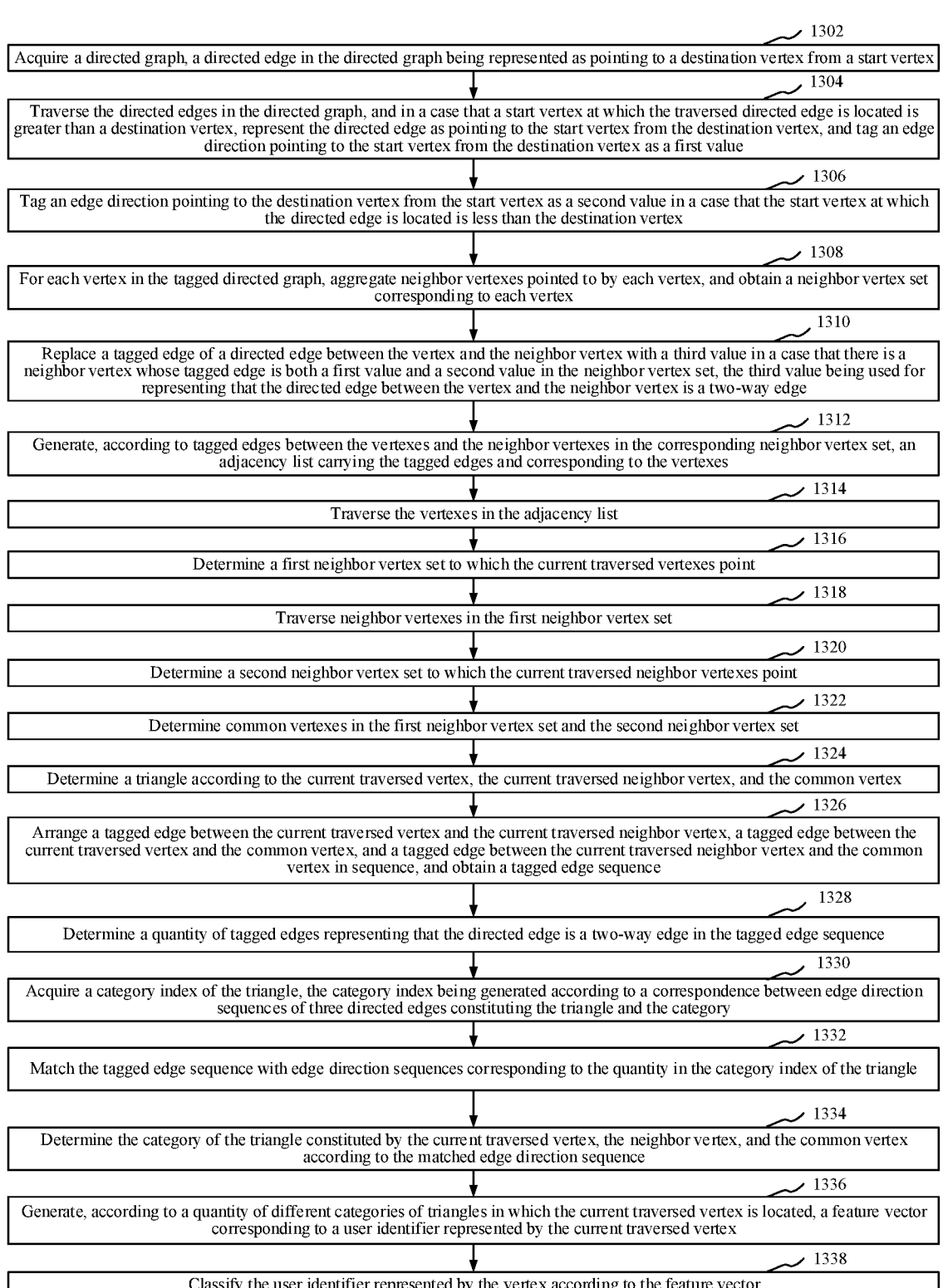

1302

Acquire a directed graph, a directed edge in the directed graph being represented as pointing to a destination vertex from a start vertex

1304

Traverse the directed edges in the directed graph, and in a case that a start vertex at which the traversed directed edge is located is greater than a destination vertex, represent the directed edge as pointing to the start vertex from the destination vertex, and tag an edge direction pointing to the start vertex from the destination vertex as a first value

1306

Tag an edge direction pointing to the destination vertex from the start vertex as a second value in a case that the start vertex at which the directed edge is located is less than the destination vertex

1308

For each vertex in the tagged directed graph, aggregate neighbor vertexes pointed to by each vertex, and obtain a neighbor vertex set corresponding to each vertex

1310

Replace a tagged edge of a directed edge between the vertex and the neighbor vertex with a third value in a case that there is a neighbor vertex whose tagged edge is both a first value and a second value in the neighbor vertex set, the third value being used for representing that the directed edge between the vertex and the neighbor vertex is a two-way edge

1312

Generate, according to tagged edges between the vertexes and the neighbor vertexes in the corresponding neighbor vertex set, an adjacency list carrying the tagged edges and corresponding to the vertexes

1314

Traverse the vertexes in the adjacency list

1316

Determine a first neighbor vertex set to which the current traversed vertexes point

1318

Traverse neighbor vertexes in the first neighbor vertex set

1320

Determine a second neighbor vertex set to which the current traversed neighbor vertexes point

1322

Determine common vertexes in the first neighbor vertex set and the second neighbor vertex set

1324

Determine a triangle according to the current traversed vertex, the current traversed neighbor vertex, and the common vertex

1326

Arrange a tagged edge between the current traversed vertex and the current traversed neighbor vertex, a tagged edge between the current traversed vertex and the common vertex, and a tagged edge between the current traversed neighbor vertex and the common vertex in sequence, and obtain a tagged edge sequence

1328

Determine a quantity of tagged edges representing that the directed edge is a two-way edge in the tagged edge sequence

1330

Acquire a category index of the triangle, the category index being generated according to a correspondence between edge direction sequences of three directed edges constituting the triangle and the category

1332

Match the tagged edge sequence with edge direction sequences corresponding to the quantity in the category index of the triangle

1334

Determine the category of the triangle constituted by the current traversed vertex, the neighbor vertex, and the common vertex according to the matched edge direction sequence

1336

Generate, according to a quantity of different categories of triangles in which the current traversed vertex is located, a feature vector corresponding to a user identifier represented by the current traversed vertex

1338

Classify the user identifier represented by the vertex according to the feature vector

FIG. 13

METHOD AND APPARATUS FOR PROCESSING GRAPH DATA, DEVICE, STORAGE MEDIUM, AND PROGRAM PRODUCT

CROSS-REFERENCE TO RELATED APPLICATION(S)

This application is a bypass continuation of International Application No. PCT/CN2022/078206, filed with the World Intellectual Property Organization on Feb. 28, 2022, which claims priority to Chinese Patent Application No. 202110248839.7, filed with the National Intellectual Property Administration, PRC on Mar. 8, 2021, the disclosures of which are herein incorporated by reference in their entireties.

BACKGROUND

1. Field

The disclosure relates to the field of big data processing technologies, and in particular, to a method and an apparatus for processing graph data, a computer device, a storage medium, and a program product.

2. Description of Related Art

A graph is a data structure that represents a relationship between a series of objects. When there is a common vertex between two adjacent vertexes in the graph, the two vertexes and the common vertex may constitute a triangle. A quantity of triangles may reflect the density and quality of a network represented by the graph to some extent. For example, in recent years, with a rapid development of Internet technology, more and more users join a variety of community networks. A community network may be treated as a graph, where the people in the community network correspond to vertexes in the graph, and an interpersonal relationship in the community network corresponds to an edge in the graph. A quantity of triangles in the community network graph may thereby reflect the density of the community network to some extent.

In the related art, triangle count methods for graph structure data can typically be divided into two major categories, namely, triangle count methods based on vertex matching and triangle count methods based on edge matching. However, these two types of methods are mainly applied to undirected graphs, and are not suitable for the identification of triangle categories caused by the directionality of edges. In addition, these two types of methods repeat the count of triangles for each vertex in the graph, resulting in each triangle being counted three times. This results in considerable redundant calculations, which consumes more computational resources.

SUMMARY

In accordance with certain embodiments of the present disclosure, a graph data processing method is provided. The graph data processing method may be performed by at least one processor. The graph data processing method may include acquiring a directed graph, a directed edge in the directed graph being represented as pointing to a destination vertex from a start vertex. The graph data processing method may further include representing the directed edge in a unified form according to a specified order between a vertex identifier of the start vertex and a vertex identifier of the destination vertex. The graph data processing method may further include generating a tagged edge for recording an original edge direction of the directed edge, to obtain a tagged directed graph. The graph data processing method may further include identifying a category of a triangle constituted by a vertex in the tagged directed graph, a neighbor vertex of the vertex, and a common vertex commonly adjacent to the vertex and the neighbor vertex, based on tagged edges between two of the vertex, the neighbor vertex, and the common vertex. The identified category of the triangle may be used for generating a feature vector of the vertex.

In accordance with other embodiments of the present disclosure, a graph data processing apparatus is provided. The graph data processing apparatus may include at least one memory configured to store computer program code. The graph data processing apparatus may further include at least one processor configured to operate as instructed by the computer program code. The computer program code may include acquisition code configured to cause the at least one processor to acquire a directed graph, a directed edge in the directed graph being represented as pointing to a destination vertex from a start vertex. The computer program code may further include edge representation code configured to cause the at least one processor to represent the directed edge in a unified form according to a specified order between a vertex identifier of the start vertex and a vertex identifier of the destination vertex. The computer program code may further include edge tagging code configured to cause the at least one processor to generate a tagged edge for recording an original edge direction of the directed edge, and obtain a tagged directed graph. The computer program code may further include identification code configured to cause the at least one processor to identify a category of a triangle constituted by a vertex in the tagged directed graph, a neighbor vertex of the vertex, and a common vertex commonly adjacent to the vertex and the neighbor vertex, based on tagged edges between two of the vertex, the neighbor vertex, and the common vertex. The identified category of the triangle may be used for generating a feature vector of the vertex.

In accordance with still other embodiments of the present disclosure, at least one least one non-transitory computer-readable storage medium is provided. The non-transitory computer-readable storage medium may store computer-readable instructions. The computer-readable instructions, when executed by at least one processor, may cause the at least one processor to acquire a directed graph, a directed edge in the directed graph being represented as pointing to a destination vertex from a start vertex. The computer-readable instructions may further cause the at least one processor to represent the directed edge in a unified form according to a specified order between a vertex identifier of the start vertex and a vertex identifier of the destination vertex. The computer-readable instructions may further cause the at least one processor to generate a tagged edge for recording an original edge direction of the directed edge, to obtain a tagged directed graph. The computer-readable instructions may further cause the at least one processor to identify a category of a triangle constituted by a vertex in the tagged directed graph, a neighbor vertex of the vertex, and a common vertex commonly adjacent to the vertex and the neighbor vertex, based on tagged edges between two of the vertex, the neighbor vertex, and the common vertex. The identified category of the triangle may be used for generating a feature vector of the vertex.

BRIEF DESCRIPTION OF THE DRAWINGS

To describe the technical solutions in the embodiments of the disclosure more clearly, the following briefly describes the accompanying drawings required for describing the embodiments. The accompanying drawings in the following description show only some embodiments of the disclosure, and a person of ordinary skill in the art may derive other embodiments according to the accompanying drawings without creative efforts.

FIG. 2 is a schematic flowchart of a graph data processing method, according to an embodiment;

FIG. 3 is a schematic diagram of an outgoing edge and an incoming edge in a directed graph, according to an embodiment;

FIG. 8 is a schematic diagram of a generated category index of a triangle, according to an embodiment;

FIG. 9 is a schematic diagram of a generated category index of a triangle, according to another embodiment;

FIG. 10 is a schematic flowchart of a graph data processing method, according to another embodiment;

FIG. 13 is a schematic flowchart of a graph data processing method, according to an embodiment;

DETAILED DESCRIPTION

To make the objectives, technical solutions, and advantages of the disclosure clearer, the following further describes the disclosure in detail with reference to the accompanying drawings and the embodiments. It is to be understood that the specific embodiments described herein are only used for explaining the disclosure, and are not used for limiting the disclosure.

A graph data processing method according to the disclosure relates to certain concepts of graph structure data.

A graph is a data structure that represents a relationship between a series of objects. Relationship data in any network represented by the graph may be represented using an adjacency matrix or an adjacency list.

A vertex in the graph refers to a to-be-analyzed object in the network. Each object in the network corresponds to a vertex in the graph, for example, each user in a community network may be a vertex.

An edge in the graph is a connection between two vertexes in the graph, and is used for representing a relationship between the two vertexes, such as a "following" relationship and a "friendship" relationship between two people in the community network.

A directed graph is a graph in which an edge may have a direction; for example, the "following" relationship between users has a direction. For a vertex, there are two associated directions, an outgoing edge and an incoming edge. An outgoing edge refers to an edge pointed outward in direction from the vertex, and an incoming edge refers to an edge pointed inward in a direction toward the vertex.

An undirected graph, in contrast, is a graph in which an edge has no direction.

A "triangle count" of a directed graph refers to a process of finding all triangles in the graph and counting a quantity of each triangle by processing a graph structure data of the directed graph.

Figure 1:
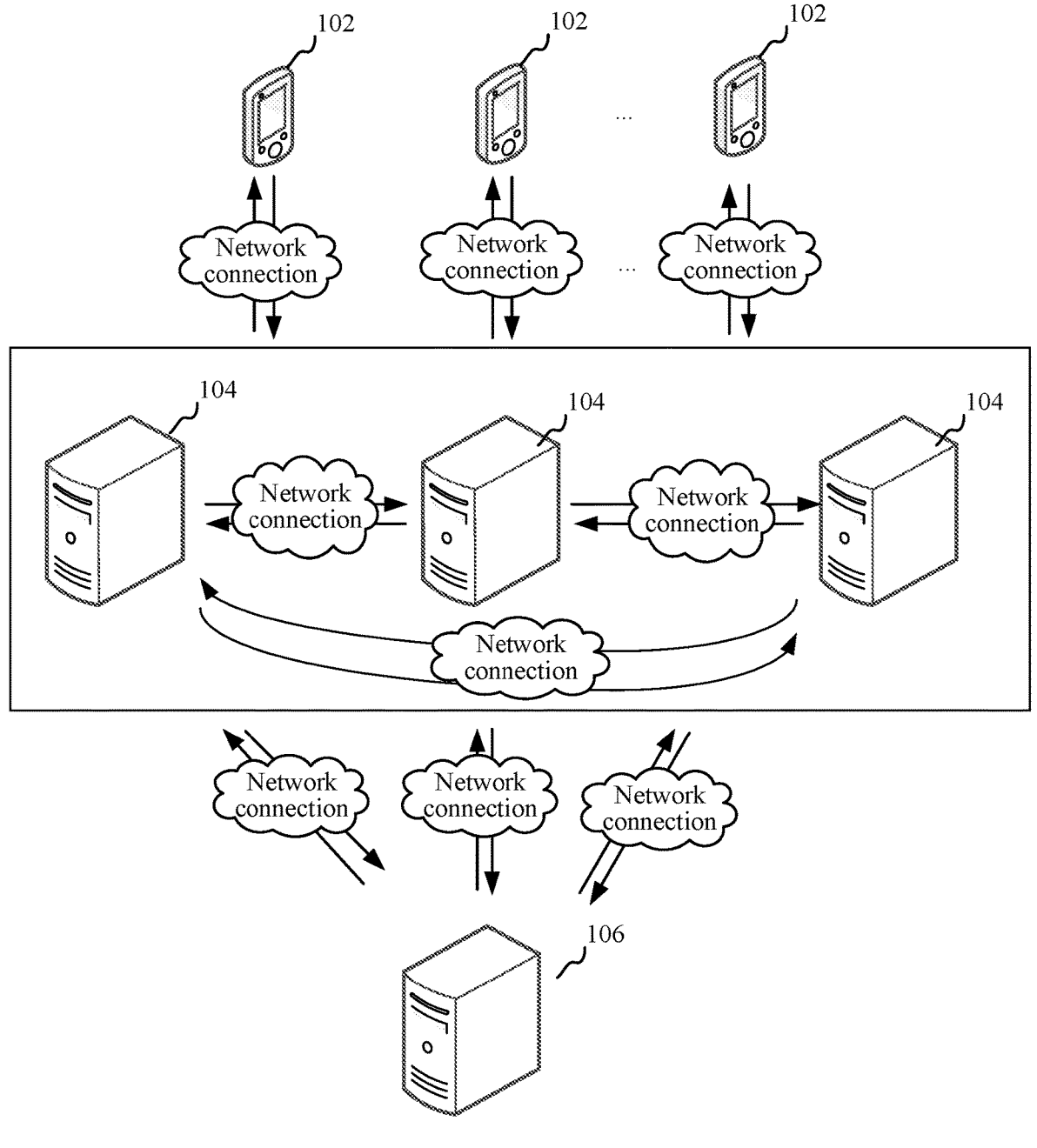
FIG. 1 is a diagram of an application environment of a graph data processing method, according to an embodiment.

The graph data processing method according to the disclosure may be applied to an application environment shown in FIG. 1. A terminal 102 and a first server 104 may be directly or indirectly connected in a wired or wireless communication manner, which is not limited in the disclosure. Two or more terminals 102 may interact through an application server. When an application client is running on the terminal, the application server provides support for the terminal to interact through the application client. The application server may obtain relationship data formed when the terminal interacts, such as a contact list, a friend list, a fan list, and a payment record. The application server may transmit the relationship data to the first server 104. The first server 104 may be disposed in a distributed manner, a second server 106 may communicate with the first server 104 disposed in a distributed manner, and the second server 106 may be a storage server. The first server 104 may push a partial adjacency list of a directed graph generated according to the relationship data to the second server 106, so that each first server 104 may pull a neighbor vertex set corresponding to each vertex from the second server, thereby identifying a quantity and a category of triangles. The application server may be a separate server from the first server 104. The application server may alternatively be integrated with the first server 104.

In an embodiment, the first server 104 may acquire a directed graph, a directed edge in the directed graph being represented as pointing to a destination vertex from a start vertex; represent the directed edge as pointing to a larger vertex from a smaller vertex, or represent the directed edge as pointing to the smaller vertex from the larger vertex, according to a size relationship between a vertex identifier of a start vertex and a vertex identifier of a destination vertex; generate a tagged edge for recording an original edge direction of the directed edge, and obtain a tagged directed graph; and identify, based on tagged edges between any two of a vertex in the tagged directed graph, a neighbor vertex of the vertex, and a common vertex commonly adjacent to the vertex and the neighbor vertex, a category of a triangle constituted by the vertex, the neighbor vertex, and the common vertex.

The terminal may be, but is not limited to, various personal computers, smartphones, tablet computers, notebook computers, desktop computers, smart speakers, smartwatches, or the like, which is not limited thereto. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

The graph data processing method according to the embodiment of the disclosure may be performed by a graph data processing apparatus according to the embodiment of the disclosure, or a computer device integrated with the graph data processing apparatus. The graph data processing apparatus may be implemented in a hardware or software manner. The computer device may be the terminal or the server.

Typically, when processing graph data formed by a large-scale network on a computer device, operation time and resources are increased geometrically, and a computer memory may overflow due to high memory usage. Therefore, when processing the graph data, embodiments of the invention fully consider the nature and scale of the graph data, evaluate the computing complexity and spatial complexity of processing the graph data, and further consider a network traffic especially in a distributed environment. In the graph data processing method according to the disclosure, the directed edge of the directed graph is represented in a unified form, in an original representation form of pointing to the destination vertex from the start vertex, and according to a specified order between the vertex identifiers of the start vertex and the destination vertex. As a result, when subsequently counting the quantity of the triangles, finding a same triangle a plurality of times can be averted, thereby avoiding redundant calculations of the triangles, saving computing resources, running faster, and consuming less computing resources. In particular, a computing pressure brought by a super vertex with many neighbors can be greatly relieved, while the correctness of calculation is ensured. In addition, for a re-represented directed edge, an original edge direction of the directed edge is further recorded by a tagged edge, so that a triangle can be determined in the tagged directed graph and a category of the triangle can be identified, which implements the identification of the triangle category caused by the directionality of edges in the directed graph.

In an embodiment, in the graph data processing method according to the embodiment of the disclosure, after a triangle category of a triangle in which each vertex is located and a quantity of each category of triangles in the directed graph are obtained, the quantity of different categories of triangles may be used as a topological feature of the vertex in the directed graph. The topological feature may be combined with an image feature of the vertex to constitute a feature vector of the vertex. The generated feature vector may be used as an input for a task based on machine learning (ML), and applied to a pattern identification task in various scenarios.

For example, there are N categories of triangles formed by the directionality of the edges. The computer device may generate an N-dimensional topological feature about the triangle according to a quantity of vertexes corresponding to the N triangles. Each element of the topological feature may represent whether the vertex exists in a corresponding category of triangles, or each element may represent a quantity of the vertex corresponding to each category of triangles. In a specific application scenario, the topological feature of the vertex about the triangle may be applied to financial risk control products to identify abnormal tasks such as illegal credit intermediaries, cashing out, multi-head lending, and gambling.

In an embodiment, the quantity and category of triangles in which a vertex is located may be used for calculating a clustering coefficient of the vertex. The clustering coefficient of the vertex is a coefficient that represents the degree of vertex clustering, and can reflect the importance of the vertex to a certain extent. The clustering coefficient is equal to dividing a quantity of connected edges between all neighbor vertexes connected to the vertex by the maximum quantity of edges that can be connected between these neighbor vertexes. The quantity of triangles in which the vertex is located is a quantity of connected edges between the neighbor vertexes connected to the vertex. The computer device may unearth relatively important vertexes from a large-scale community network according to the clustering coefficient of the vertex, which is well applied to abnormal task scenarios such as illegal credit intermediaries, cashing out, multi-head lending, and gambling.

In an embodiment, the quantity and category of triangles in which the vertex is located may be applied in a community discovery scenario. Community discovery is a process of unearthing community sub-networks in a large-scale community network based on the characteristics of strong connections between vertexes within a same community sub-network and sparse connections between communities in the large-scale community network. For example, the computer device may determine whether two vertexes belong to a same sub-network by determining whether the two vertexes can constitute a triangle with a common neighbor vertex of the two, thereby unearthing the community sub-networks belonging to the same sub-network from the community network.

In an embodiment, the quantity and category of triangles in which the vertex is located may be applied in a link prediction scenario. Link prediction predicts the possibility of a link occurring between two vertexes in which edges are not yet connected in a network, including a prediction of unknown links and a prediction of future links, through information such as known vertexes in the network and a network structure. The greater the similarity between the two vertexes, the greater the possibility that there is a link between the two vertexes. The topological feature of the vertex about the triangle may be involved in the definition of the similarity between the vertexes. For example, the computer device may generate a feature vector of an object according to a quantity of the object corresponding to different categories of triangles in a disease infection network, and predict a possible infection path of the object in the disease infection network according to the feature vector.

In an embodiment shown in FIG. 2, a graph data processing method is provided. A description is made using an example in which the method is applied to the computer device (for example, the terminal or the server) in FIG. 1, and the method includes the following operations.

Operation 202: Acquire a directed graph, a directed edge in the directed graph being represented as pointing to a destination vertex from a start vertex.

In the embodiment of the disclosure, a research object is a directed graph. Most of graphs in an actual application are directed graphs. The directed graph is more practical than an undirected graph. An edge in the directed graph is an edge with directionality. The edge in the directed graph may be represented by pointing to the destination vertex from the start vertex, indicating that an edge direction of the directed edge is pointing to the destination vertex from the start vertex. For example, if the start vertex is src and the destination vertex is dst, a directed edge pointing to dst from src may be represented by (src, dst). For a vertex in the directed graph, there are two directions of an outgoing edge and an incoming edge. The outgoing edge refers to an edge pointed out by the vertex, and the incoming edge refers to an edge in which the vertex is pointed, as shown in FIG. 3. A triangle in the directed graph may be represented by three vertexes of [src, dst, neighbor]. The neighbor is a common vertex commonly adjacent to src and dst in the directed graph. Triangle count of the directed graph refers to a process of finding all triangles in the graph and counting a quantity of each triangle by processing graph structure data of the directed graph.

Figure 4:
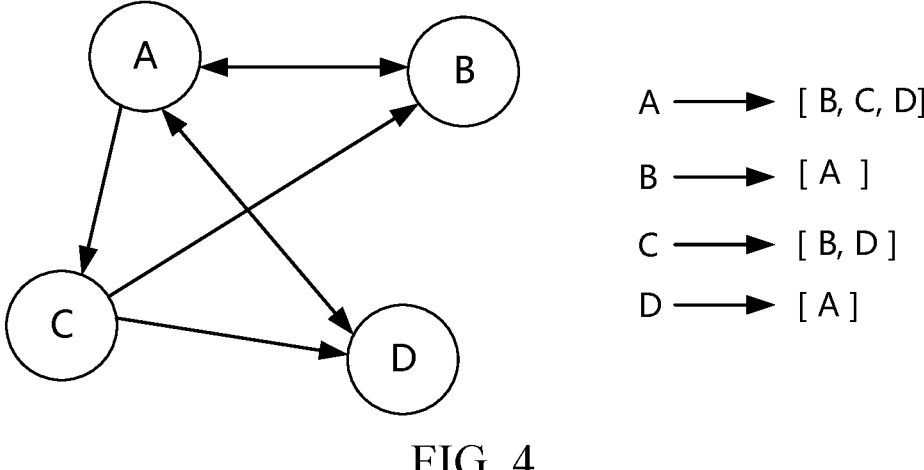
FIG. 4 is a schematic diagram of an adjacency list of a directed graph, according to an embodiment.
Figure 5:
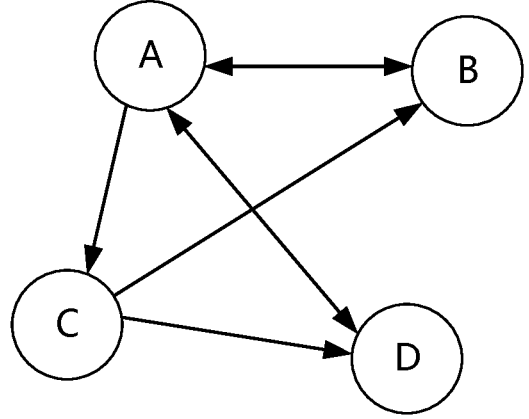
FIG. 5 is a schematic diagram of an adjacency matrix of a directed graph, according to an embodiment.

As described above, the graph may be represented by an adjacency matrix or an adjacency list, and the directed graph may also be represented by the adjacency matrix or the adjacency list. In the adjacent list, for each vertex in the directed graph, a list of directed edges represented by neighbor vertexes pointed to from the vertex is stored. For example, as shown in FIG. 4, the directed graph includes four vertexes A, B, C, and D. The vertex A has three edges respectively pointing to the destination vertexes B, C, and D, the vertex B has an edge pointing to the destination vertex A, the vertex C has two edges respectively pointing to the destination vertexes B and D, and the vertex D has an edge pointing to the vertex A. In the adjacency matrix, both rows and columns represent vertexes, and a corresponding element Vij in the matrix determined by two vertexes (located at an i-th row and a j-th column in the matrix) represents whether there is a directed edge pointing to a vertex j from a vertex i. As shown in FIG. 5, the directed graph in FIG. 4 is represented as the adjacency matrix. If there is the directed edge pointing to the vertex j from the vertex i, the corresponding element Vij in the matrix is 1, and if not, the corresponding element Vij in the matrix is 0.

Specifically, the computer device may acquire an adjacency list or an adjacency matrix corresponding to the directed graph, thereby acquiring a directed graph and an edge relationship between the respective vertexes in the directed graph.

In an embodiment, the directed graph may be a payment network relationship graph. The computer device may acquire a payment record corresponding to user identifiers; obtain payment interaction data between the user identifiers according to the payment record; and generate a directed payment network relationship graph according to the payment interaction data, a vertex of the payment network relationship graph representing the user identifier, and a directed edge between two vertexes in the payment network graph representing that there is a one-way or two-way payment interaction event between corresponding two user identifiers.

In this embodiment, the computer device may determine sub-graphs in which payment interactions are very close from the directed graph according to the quantity and category of triangles in which the vertex is located in the directed graph. The computer device may determine users whose payment interactions are very close according to the sub-graphs. For example, in an application scenario, the computer device may implement identifying illegal credit intermediaries or groups from a large quantity of users.

In an embodiment, the directed graph may be a community network graph. The computer device may acquire a contact list corresponding to user identifiers, obtain contact relationship data corresponding to the user identifier according to the contact list, and generate a directed community network graph according to the contact relationship data. A vertex in the community network graph represents the user identifier, and a directed edge between two vertexes in the community network graph represents that there is a one-way or two-way contact relationship between corresponding two user identifiers. The contact list may be a friend list that a current user follows, a user list that the current user has favorited, or a user list that the current user has privately messaged.

In this embodiment, the computer device may determine two associated vertexes in the directed graph according to the quantity and category of triangles in which the vertex is located in the directed graph. Based on this, the computer device may recommend another associated user to the user to add a contact, and may also recommend, to the user, objects of interest to another associated user, such as songs, videos, commodities, or articles.

In an embodiment, the directed graph may further be a knowledge map that characterizes a directional relationship between entities. The computer device may acquire graph structure data corresponding to the knowledge map, obtain vertexes in the directed graph according to entities characterized by the graph structure data, and obtain an edge direction between the vertexes in the directed graph according to a directional entity relationship between the entities characterized by the graph structure data, thereby obtaining a directed graph corresponding to the knowledge map.

In this embodiment, the computer device may find out the possibility of generating a relationship between two vertexes between which a relationship is not yet generated in the knowledge map according to a quantity and category of triangles in which the vertex is located in the directed graph correspond to the knowledge map, thereby enriching domain knowledge expressed by the knowledge map.

Operation 204: Represent the directed edge in a unified form according to a specified order between a vertex identifier of the start vertex and a vertex identifier of the destination vertex.

The specified order may be a size order between the vertex identifiers, that is, a size relationship. The specified order may alternatively be a sequential order in which the vertex identifiers are generated.

In an embodiment, the computer device may determine a size relationship between the start vertex and the destination vertex according to a size relationship between the vertex identifiers of the vertexes, represent the directed edge as pointing to a larger vertex from a smaller vertex, or represent the directed edge as pointing to the smaller vertex from the larger vertex.

Each vertex in the directed graph is represented by the vertex identifier, which may be recorded as srcID and dstID. Each vertex identifier is different, and a size of the vertex may be measured by a size of the vertex identifier. The larger vertex is a vertex with a larger vertex identifier between the start vertex and the destination vertex. The smaller vertex is a vertex with a smaller vertex identifier between the start vertex and the destination vertex.

Optionally, the vertex identifier corresponding to the vertex may be a value, then the computer device may determine the size relationship between the start vertex and the destination vertex by comparing sizes of values corresponding to the vertex identifiers. For example, a vertex identifier corresponding to the vertex A is 00001, and a vertex identifier corresponding to the vertex B pointed to by the vertex A is 00020, then the computer device may determine that the vertex A is smaller than the vertex B.

Optionally, the vertex identifier corresponding to the vertex may further be a character string formed by characters, and the characters may include at least one of letters and numbers. The computer device may determine the size relationship of the vertexes by comparing sizes of the character strings, where a size relationship of the character strings may be defined as required. For example, the computer device may first compare by a length of the character string. The longer the character string, the greater the character string. In a case of the same length, the computer device further compares sizes of the first different letters from a high bit to a low bit, thereby obtaining a size relationship of the two vertexes. For example, the vertex identifier corresponding to the vertex A is abcd, the vertex identifier corresponding to the vertex B pointed to by the vertex A is abc, then the vertex A is greater than the vertex B, and a vertex identifier corresponding to the vertex C pointed to by the vertex A is abca, then the vertex C is greater than the vertex A.

Currently, a triangle count method applicable to the undirected graph may be roughly divided into a triangle count method based on vertex matching and a triangle count method based on edge matching. In the triangle count method based on vertex matching, for each vertex v in the undirected graph, a neighbor vertex set N(v) is found, and for each vertex u in N(v), a neighbor vertex set N(u) is found. For each vertex w in N(u), if w is not equal to v, [v, u, w] constitutes a triangle. Since the method performs operations on each vertex, and further finds triangles formed by [u, w, v] and [w, u, v], and because of the undirected graph, a triangle constituted by three vertexes of v, u, and w is found three times, and there are serious redundant calculations. In the triangle count method based on edge matching, the neighbor vertex sets N(v) and N(u) of v and u are found respectively for each edge (v, u) in the graph, and intersection vertexes of N(v) and N(u) are calculated. The vertex v, the vertex u, and each vertex in the intersections constitute a triangle. Therefore, a quantity of the intersections is a quantity of triangles in which the edge (v, u) is located. Similarly, since each triangle is calculated three times, there are also serious redundant calculations. In the two methods described above, when the vertex v is a super vertex with a very large quantity of neighbors, the amount of calculation of the triangle count on the vertex v becomes quite large.

In order to avoid duplicate calculations of the triangles, the computer device may represent the directed edge as pointing to the larger vertex from the smaller vertex, or represent the directed edge as pointing to the smaller vertex from the larger vertex, according to the size relationship between the start vertex and the destination vertex. Specifically, each directed edge in the directed graph is uniformly represented as a form of the srcID being less than the dstID or a form of the srcID being greater than the dstID, and the tagged edge is used to indicate the original edge direction of the directed edge to avoid redundant calculations. Additionally, the vertex identifier corresponding to the vertex itself is stored in the adjacency list or the adjacency matrix. Therefore, it is not necessary to require additional calculation and storage to determine the size of the vertex according to the vertex identifier.

In an embodiment, the computer device may represent the directed edge as pointing to the start vertex from the destination vertex when the start vertex at which the directed edge is located is greater than the destination vertex, and if the start vertex is less than the destination vertex, there is no need to re-represent. Specifically, the computer device may traverse the directed edges in the directed graph. When a start vertex at which the traversed directed edge is located is greater than a destination vertex, the computer device represents the directed edge as pointing to the start vertex from the destination vertex.

In an embodiment, the computer device may represent the directed edge as pointing to the start vertex from the destination vertex when the start vertex at which the directed edge is located is less than the destination vertex, and if the start vertex is greater than the destination vertex, there is no need to re-represent. Specifically, the computer device may traverse the directed edges in the directed graph. When a start vertex at which the traversed directed edge is located is less than a destination vertex, the computer device represents the directed edge as pointing to the start vertex from the destination vertex.

In an embodiment, the computer device may further acquire a sequential order in which each vertex in the directed graph is generated, acquire a sequential order in which the vertex identifiers of the start vertex and the destination vertex in the directed edge are generated, and re-represent the directed edge in the directed graph in a form of a previously generated vertex pointing to a later generated vertex, or re-represent the directed edge in the directed graph in a form of the later generated vertex pointing to the previously generated vertex. For example, when the vertex represents the user identifier, a generation time of the user identifier may be used as a generation time of a corresponding vertex, thereby determining the sequential order in which the vertexes are generated.

Operation 206: Generate a tagged edge for recording an original edge direction of the directed edge, and obtain a tagged directed graph.

The tagged edge is used for recording the original edge direction of the directed edge in the directed graph. Since a category of a triangle is determined according to edge directions of three directed edges that constitute the triangle, after the directed edge is re-represented, it is necessary to record the original edge direction by the tagged edge to obtain the tagged directed graph, so that the category of the triangle in which the directed edge is located can be confirmed subsequently.

In an embodiment, the tagged edge is used for tagging whether the directed edge is an incoming edge or an outgoing edge relative to a re-represented start vertex. In some embodiments, the tagged edge is used for tagging whether the directed edge is an incoming edge or an outgoing edge relative to a re-represented destination vertex. In other embodiments, the tagged edge further includes a value which may represent that the directed edge is a two-way edge. For example, the outgoing edge may be tagged as 0, the incoming edge may be tagged as 1, and the two-way edge may be tagged as 2. For another example, the outgoing edge may be tagged as OUT, the incoming edge may be tagged as IN, and the two-way edge may be tagged as Recip. The specific form of the tagged edge is not limited in the embodiment of the disclosure.

In an embodiment, when the tagged edge is used for tagging whether the directed edge is an incoming edge or an outgoing edge relative to the re-represented start vertex, for the directed edges uniformly represented in a form of the srcID being less than the dstID, the computer device may tag, as a first value, an edge direction of the directed edge re-represented as pointing to the start vertex from the destination vertex. That is, the directed edge is originally an incoming edge relative to the destination vertex, and after a re-representation, the destination vertex becomes a new start vertex, and the directed edge is an incoming edge relative to the new start vertex, and the edge direction is recorded as the first value. For a directed edge that is not re-represented, the directed edge is an outgoing edge relative to the original start vertex, and an edge direction of the directed edge may be tagged as a second value. The first value may be 1, and the second value may be 0.

In an embodiment, when the tagged edge is used for tagging whether the directed edge is an incoming edge or an outgoing edge relative to the re-represented start vertex, for the directed edges uniformly represented in a form of the srcID being greater than the dstID, the computer device may tag, as a first value, an edge direction of the directed edge re-represented as pointing to the start vertex from the destination vertex. That is, the directed edge is originally an incoming edge relative to the destination vertex, and after a re-representation, the destination vertex becomes a new start vertex, the directed edge is an incoming edge relative to the new start vertex, and the edge direction is recorded as the first value. For a directed edge that does not need to be re-represented, the directed edge is an outgoing edge relative to the original start vertex, and an edge direction of the directed edge may be tagged as a second value. The first value may be 1, and the second value may be 0.

In an embodiment, the computer device may record an edge direction of the directed edge relative to the start vertex after representing the directed edge in a unified form, that is, the tagged edge is used for recording whether the directed edge is an incoming edge or an outgoing edge relative to the re-represented start vertex. Specifically, an original directed edge is (src, dst). After the computer device re-represents the directed edge in the form of the srcID being less than the dstID, when the tagged edge is tag=0, it indicates that the directed edge is an outgoing edge relative to a new start vertex, and in a case of tag=1, it indicates that the edge is an incoming edge relative to the new start vertex. For example, the vertex identifier corresponding to the vertex A in the directed graph is 002, the vertex identifier corresponding to the vertex B pointed to by the vertex A is 001, and an original directed edge in the directed graph is (A, B). The directed edge is an outgoing edge relative to the vertex A, and is an incoming edge relative to the vertex B. The computer device represents the directed edge as (B, A) in the form of the srcID being less than the dstID, and records, as 1, a tagged edge in which the directed edge is an incoming edge relative to a new start vertex B.

In an embodiment, the computer device may also record an edge direction of the directed edge relative to the destination vertex after representing the directed edge in a unified form, that is, whether the directed edge is an incoming edge or an outgoing edge relative to the re-represented destination vertex. Specifically, an original directed edge is (src, dst). After the computer device re-represents the directed edge in the form of the srcID being less than the dstID, when the tagged edge is tag=0, it indicates that the directed edge is an outgoing edge relative to a new destination vertex, and in a case of tag=1, it indicates that the edge is an incoming edge relative to the new destination vertex. For example, the vertex identifier corresponding to the vertex A in the directed graph is 002, the vertex identifier corresponding to the vertex B pointed to by the vertex A is 001, and an original directed edge in the directed graph is (A, B). The directed edge is an outgoing edge relative to the vertex A, and is an incoming edge relative to the vertex B. The computer device represents the directed edge as (B, A) in the form of the srcID being less than the dstID, and records, as 0, a tagged edge in which the directed edge is an outgoing edge relative to a new destination vertex A.

Figure 6:
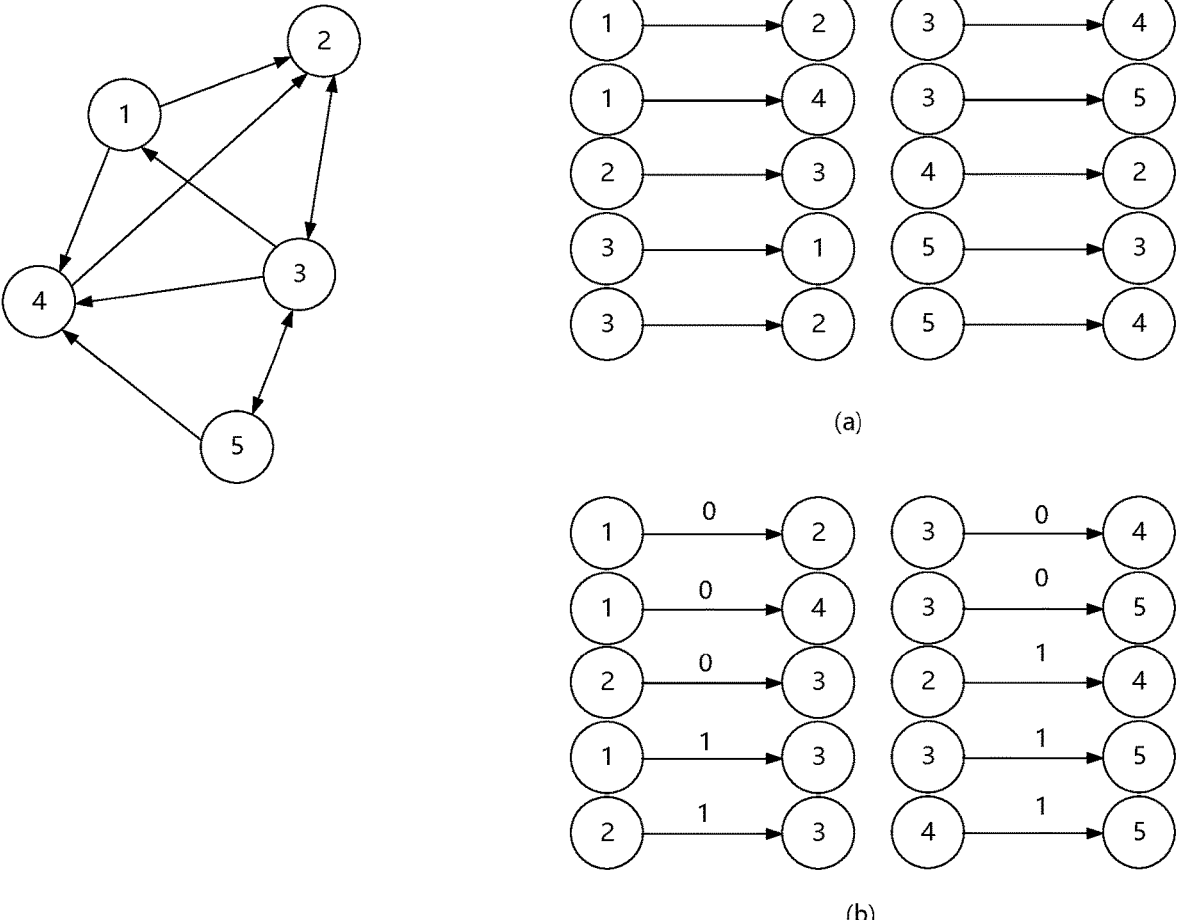
FIG. 6 is a schematic diagram in which directed edges in a directed graph are represented uniformly, according to an embodiment.

FIG. 6 is a schematic diagram in which directed edges in a directed graph are represented uniformly according to an embodiment. Referring to FIG. 6, the directed graph includes a vertex 1, a vertex 2, a vertex 3, a vertex 4, and a vertex 5. The original directed edges in the directed graph are as shown in a part (a) in FIG. 6. The computer device generates a tagged edge for each directed edge relative to the new start vertex after re-representing the directed edge according to the form of the srcID being less than the dstID. The tagged edge is used for recording the original edge direction of the directed edge, as shown in a part (b) in FIG. 6. As can be seen from the part (a) in FIG. 6, in an original directed graph, there are directed edges in which the vertex identifier of the start vertex is greater than the vertex identifier of the destination vertex, that is, a directed edge in which the vertex 3 points to the vertex 2, a directed edge in which the vertex 4 points to the vertex 2, a directed edge in which the vertex 5 points to the vertex 3, and a directed edge in which the vertex 5 points to the vertex 4. As can be seen from the part (b) in FIG. 6, in a tagged directed graph, there is no directed edge in which the vertex identifier of the start vertex is greater than the vertex identifier of the destination vertex, and the vertex identifier of the start vertex is less than the vertex identifier of the destination vertex in the tagged directed edge.

In an embodiment, after generating the tagged edge of the directed edge, the method further includes: for each vertex in the tagged directed graph, aggregating neighbor vertexes to which the vertexes point, and obtaining a neighbor vertex set corresponding to the vertexes; and generating, according to tagged edges between the vertexes and neighbor vertexes in the corresponding neighbor vertex set, an adjacency list carrying the tagged edges and corresponding to the vertexes.

Specifically, after the computer device generates the tagged edge of the directed edge, in order to accurately count the triangles in the directed graph and reduce the computing resources consumed in a traversing process, the computer device may further collect the neighbor vertex corresponding to each vertex, to obtain the neighbor vertex set constituted by the neighbor vertex pointed to by each vertex, and generate the adjacency list carrying the tagged edges and corresponding to the vertexes according to the tagged edges between the vertexes and the neighbor vertexes in the corresponding neighbor vertex set.

In particular, in an actual application, relationship data between the vertexes in the directed graph may be stored in a distributed manner. A part of the relationship data between the vertexes is stored on each of distributed computing servers. The distributed computing server may re-represent the directed edge in a unified form and generate the tagged edge. In order to avoid the processing inefficiency caused by a network traffic with the distributed computing server during a subsequent traversing process of the triangle, the computer device may aggregate neighbor vertexes pointed to by the same vertex and tagged edges stored on each distributed computing server, to obtain a set of the neighbor vertexes pointed to by the same vertex, thereby generating the adjacency list.

In an embodiment, the method further includes: replacing a tagged edge of a directed edge between the vertex and the neighbor vertex with a third value in a case that there is a neighbor vertex whose tagged edge is both a first value and a second value in the neighbor vertex set, the third value being used for representing that the directed edge between the vertex and the neighbor vertex is a two-way edge.

It can be understood that, when there is the neighbor vertex for which the tagged edge is both the first value and the second value in the neighbor vertex set, it indicates that the directed edge corresponding to the vertex is both the outgoing edge and the incoming edge, that is, the directed edge between the neighbor vertexes pointed to is a two-way edge. In order to reduce redundant calculations, the computer device may replace the tagged edge of the directed edge between the vertex and the neighbor vertex with the third value, which removes redundant edges from the neighbor vertex set, and further saves computing resources.

Operation 208: Identify, based on tagged edges between any two of a vertex in the tagged directed graph, a neighbor vertex of the vertex, and a common vertex commonly adjacent to the vertex and the neighbor vertex, a category of a triangle constituted by the vertex, the neighbor vertex, and the common vertex.

Since the computer device re-represents the directed edge according to the form of the srcID being less than the dstID or the form of the srcID being greater than the dstID, there is no case that the same triangle is found a plurality of times when looking for a triangle according to the neighbor vertex of the vertex and the common vertex of the vertex and the neighbor vertex, thus avoiding redundant calculations. Additionally, after finding the triangle, the category of the triangle can be identified based on tagged edges of three edges of the triangle. Based on this idea, it is possible to accurately find all triangles in the directed graph and corresponding categories.

In an embodiment, the computer device may traverse the vertexes in the tagged directed graph; determine a first neighbor vertex set to which current traversed vertexes point, a second neighbor vertex set to which neighbor vertexes in the first neighbor vertex set point, and common vertexes of the first neighbor vertex set and the second neighbor vertex set; and identify, based on tagged edges between the current traversed vertex, the neighbor vertex, and the common vertex, a category of a triangle constituted by the current traversed vertex, the neighbor vertex, and the common vertex.

Specifically, after re-representing in the form of the srcID being less than the dstID and generating the tagged edge, for each new src vertex after the re-representation, a first neighbor vertex set N(src) constituted by vertexes pointed to by each new vertex src is found, it can be understood that each vertex in N(src) is a vertex greater than src. For each vertex dst in N(src), a second neighbor vertex set N(dst) constituted by vertexes pointed to by each vertex dst is found, and similarly, each vertex in N(dst) is a vertex greater than dst. For a common vertex neighbor in N(src) and N(dst), [src, dst, neighbor] constitutes a triangle. For example, a neighbor vertex set pointed to by the vertex A includes the vertex B and the vertex C, and a neighbor vertex set pointed to by the vertex B includes the vertex C, then the vertex A, the vertex B, and the vertex C may constitute a triangle. Since the directed edge is represented strictly according to srcID<dstID, there is no vertex A in the neighbor vertex set pointed to by the vertex B when processing the vertex B, and there is no vertex B in the neighbor vertex set pointed to by the vertex C when processing the vertex C. Therefore, there is no case that the same triangle is repeatedly found, thus avoiding redundant calculations.

Figure 7:
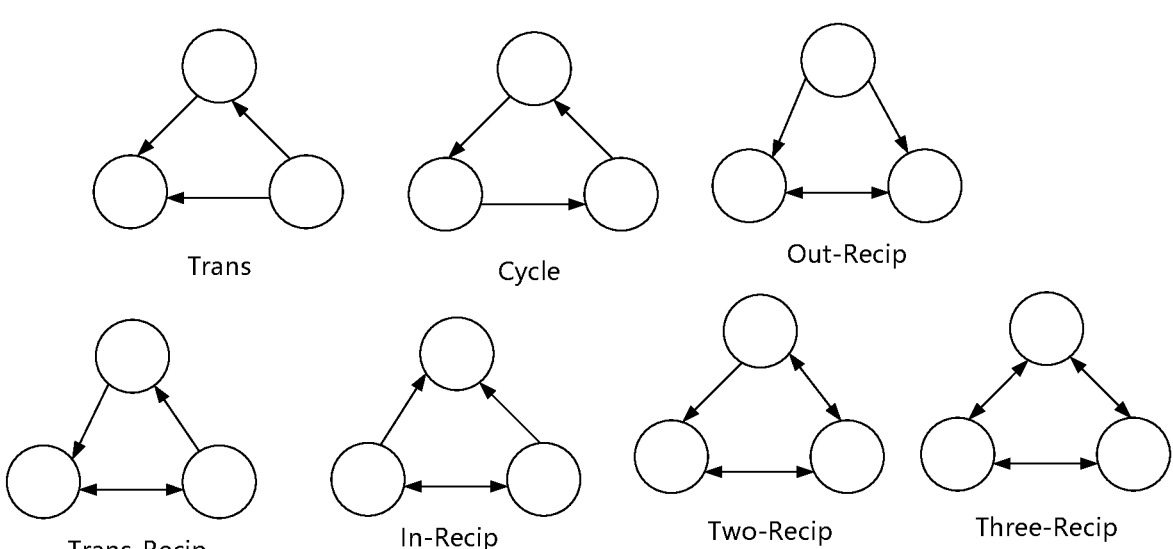
FIG. 7 is a schematic diagram of a category of a triangle in a directed graph, according to an embodiment.

The category of the triangle is determined by edge directions of three directed edges, and the edge direction is recorded by the tagged edge, so the category of the triangle is determined by the tagged edge. According to a correspondence between the tagged edge and the category of the triangle, it can be sorted out that the triangles may be divided into seven types. As shown in FIG. 7, in an embodiment, seven categories of triangles are defined according to the directionality of the three directed edges of the triangle in the directed graph. The triangles are divided into Trans, Cycle, Out-Recip, Trans-Recip, In-Recip, Two-Recip, and Three-Recip according to a quantity of two-way edges and a direction of an arrow.

In an embodiment, the computer device may acquire edge directions of three directed edges constituting a triangle and a category of the triangle; arrange the three edge directions in sequence to obtain an edge direction sequence of the triangle; and store the edge direction sequence and the category of the triangle in a corresponding manner, and generate a category index of the triangle.

FIG. 8 is a schematic diagram of a generated category index of a triangle according to an embodiment. Referring to FIG. 8, first of all, a set of edge direction sequences of the triangle constituted by [src, dst, neighbor] is given in the form of (tag1, tag2, tag3), and there is a total of 27 types of edge direction sequences. Tag1 represents a tagged edge of an edge (src, dst), tag2 represents a tagged edge of an edge (src, neighbor), and tag3 represents a tagged edge of an edge (dst, neighbor). When the outgoing edge is tagged with 0, the incoming edge is tagged with 1, and the two-way edge is tagged with 2, an edge direction sequence corresponding to the triangle with a category of Cycle is one of (0, 1, 0) and (1, 0, 1); an edge direction sequence corresponding to the triangle with a category of Trans may be one of (0, 0, 0), (0, 0, 1), (0, 1, 1), (1, 0, 0), (1, 1, 0), and (1, 1, 1); an edge direction sequence corresponding to the triangle with a category of Out-Recip may be one of (0, 0, 2), (2, 1, 1), and (1, 2, 0); an edge direction sequence corresponding to the triangle with a category of In-Recip may be one of (0, 2, 1), (2, 0, 0), and (1, 1, 2); an edge direction sequence corresponding to the triangle with a category of Trans-Recip may be one of (2, 0, 1), (2, 1, 0), (0, 2, 0), (1, 2, 1), (0, 1, 2), and (1, 0, 2); an edge direction sequence corresponding to the triangle with a category of Two-Recip is one of (2, 2, 0), (0, 2, 2), (2, 0, 2), (2, 2, 1), (1, 2, 2), and (2, 1, 2); and an edge direction sequence corresponding to the triangle with a category of Three-Recip is (2, 2, 2).

In an embodiment, the identifying, based on tagged edges between the current traversed vertex, the neighbor vertex, and the common vertex, a category of a triangle constituted by the current traversed vertex, the neighbor vertex, and the common vertex includes: arranging a tagged edge between the current traversed vertex and the neighbor vertex, a tagged edge between the current traversed vertex and the common vertex, and a tagged edge between the neighbor vertex and the common vertex in sequence, and obtaining a tagged edge sequence; and matching the tagged edge sequence with the edge direction sequences in the category index of the triangle, and obtaining the category of the triangle constituted by the current traversed vertex, the neighbor vertex, and the common vertex.

Therefore, after finding a triangle according to the current traversed vertex, the neighbor vertex, and the common vertex, the computer device may further match the tagged edge sequence constituted by the tagged edge between the current traversed vertex and the neighbor vertex, the tagged edge between the current traversed vertex and the common vertex, and the tagged edge between the neighbor vertex and the common vertex with the edge direction sequence in the category index of the triangle, so as to identify the category of the triangle constituted by the current traversed vertex, the neighbor vertex, and the common vertex.

As can be understood, in the constituted tagged edge sequence, a first tagged edge, a second tagged edge, and a third tagged edge specifically represent an edge direction between which two vertexes in the triangle, and need to be consistent with the meaning of each edge direction in the edge direction sequence in the category index of the triangle, so as to ensure the accuracy of the identified category of the triangle.

In an embodiment, the computer device may determine, according to the edge direction sequence, a quantity of two-way edges in the three directed edges constituting the triangle; and store the quantity, the edge direction sequence, and the category of the triangle in a corresponding manner, and generate a category index of the triangle.

Specifically, referring to FIG. 9, the computer device may further classify the edge direction sequence according to the quantity of two-way edges in the three directed edges constituting the triangle, that is, a quantity of the tagged edge which is 2 in the three tagged edges, that is, 0 two-way edge, 1 two-way edge, 2 two-way edges, and 3 two-way edges. After the edge direction sequence is divided into four branches, the category index of the triangle corresponding to the quantity and the edge direction sequence is then generated. In this way, the number of times of matches may be reduced, at most 7 times when the quantity of the two-way edge is 1, and the other categories only need to be matched 1 or 3 times to determine the corresponding triangle category, which further reduces calculation redundancy and improves processing efficiency. For example, when the quantity of the tagged edge which is 2 in the edge direction sequence is 0, it corresponds to a first branch, when the edge direction sequence is (0, 1, 0) or (1, 0, 1), the triangle category is Cycle, and when the edge direction sequence is otherwise (any, any, any), the triangle category belongs to Trans.

In the above graph data processing method, the directed edge of the directed graph is represented in a unified form, in an original representation form of pointing to the destination vertex from the start vertex, and according to a specified order between the vertex identifiers of the start vertex and the destination vertex. As a result, when subsequently counting the quantity of the triangles, there will be no case that a same triangle is found a plurality of times, thereby avoiding redundant calculation of the triangles, saving computing resources, running faster, and consuming less computing resources. In particular, a computing pressure brought by a super vertex with many neighbors can be greatly relieved, while the correctness of calculation is ensured. Additionally, for a re-represented directed edge, an original edge direction of the directed edge is further recorded by a tagged edge, so that a triangle can be determined in the tagged directed graph and a category of the triangle can be identified, which implements the identification of the triangle category caused by the directionality of edges in the directed graph.

In an embodiment, the directed graph is a community network graph, a vertex in the community network graph represents a user identifier in a community network, a directed edge in the community network graph represents that there is a social relationship between a user identifier corresponding to the start vertex and a user identifier corresponding to the destination vertex, and the method further includes: generating, according to a quantity of different categories of triangles in which the respective vertexes are located in the community network graph, a feature vector corresponding to the user identifier represented by the vertex; determining, according to the feature vector corresponding to the user identifier, a community sub-network graph formed by user identifiers having a similarity degree greater than a threshold from the community network graph;

and determining a community sub-network from the community network based on the community sub-network graph.

The quantity of different categories of triangles in which the vertex is located may be used as a topological feature of the vertex in the directed graph. The topological feature may be combined with an image feature of the vertex to constitute a feature vector of the vertex. The generated feature vector may be used as an input for a task based on machine learning (ML), and applied to a pattern identification task in various scenarios. In this embodiment, the quantity of triangles is applied to a community discovery scenario. The computer device may find vertexes with similarities from a large-scale community network graph according to the generated feature vector, and unearth the community sub-network from the large-scale community network according to the community sub-network graph constituted by the user identifiers corresponding to these vertexes.

In an embodiment shown in FIG. 10, a graph data processing method is provided. A description is made using an example in which the method is applied to the computer device (for example, the terminal or the server) in FIG. 1, and the method includes the following operations.

Operation 1002: Acquire a directed graph, a directed edge in the directed graph being represented as pointing to a destination vertex from a start vertex.

Operation 1004: Represent the directed edge as pointing to a larger vertex from a smaller vertex, or represent the directed edge as pointing to the smaller vertex from the larger vertex, according to a size relationship between a start vertex and a destination vertex.

Operation 1006: Identify, based on a triangle constituted by a vertex in the represented directed graph, a neighbor vertex of the vertex, and a common vertex commonly adjacent to the vertex and the neighbor vertex, a quantity of triangles in which the vertex is located.

In this embodiment, the directed edge of the directed graph is represented in a unified form, in an original representation form of pointing to the destination vertex from the start vertex, and according to a specified order between the vertex identifiers of the start vertex and the destination vertex. As a result, when subsequently counting the quantity of the triangles, there will be no case that a same triangle is found a plurality of times, thereby avoiding redundant calculations of the triangles in the directed graph, finding a quantity of triangles in which each triangle is located in the directed graph, saving computing resources, running faster, and consuming less computing resources. In particular, a computing pressure brought by a super vertex with many neighbors can be greatly relieved, while the correctness of calculation is ensured.

Figure 11:
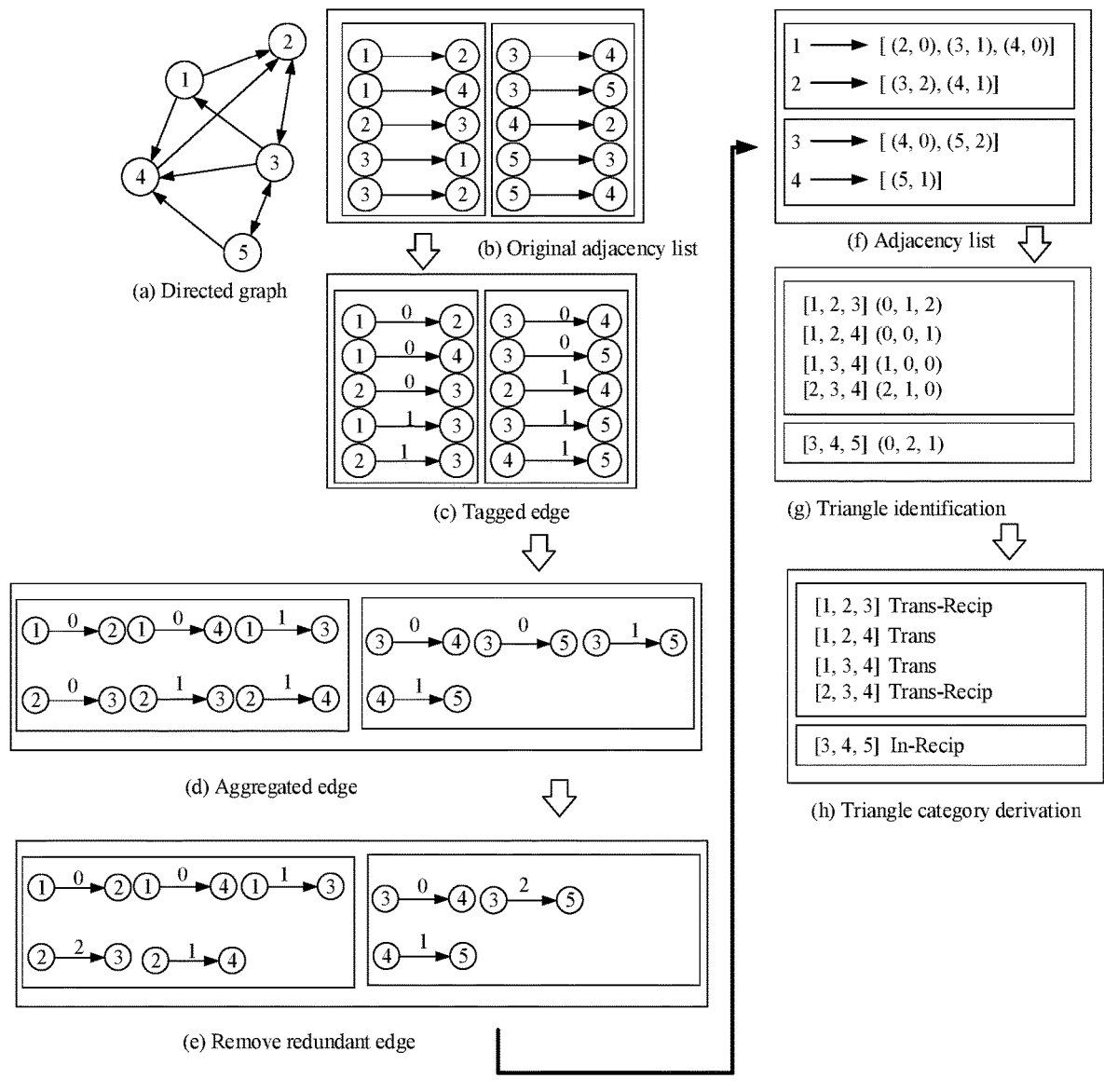
FIG. 11 is a schematic diagram of a process of processing graph data, according to an embodiment.

FIG. 11 is a schematic diagram of a graph data processing method according to a specific embodiment. Referring to FIG. 11, a part (a) in FIG. 11 is a schematic diagram of a directed graph. A part (b) in FIG. 11 is original adjacency list data of the directed graph, and the adjacency list data may be stored on a distributed vertex. A part (c) in FIG. 11 is to generate a tagged edge representing an edge direction of the directed edge after re-representing the directed edge according to the form of the srcID being less than the dstID, where a tagged edge of 1 indicates that the directed edge is an incoming edge relative to the re-represented start vertex, and a tagged edge of 0 indicates that the directed edge is an outgoing edge relative to the re-represented start vertex. A part (d) in FIG. 11 is to aggregate the directed edge and the tagged edge corresponding to each start vertex for the re-represented directed graph. A part (e) in FIG. 11 is to replace, with 2, a tagged edge of the two-way edge in which the tagged edge of the neighbor vertex pointed to by the vertex is both 1 and 0, so as to remove redundant edges. A part (f) in FIG. 11) is to generate an adjacency list carried with the tagged edge according to a set of the neighbor vertexes pointed to be each vertex.

A part (g) in FIG. 11) is to traverse each src vertex in the adjacency list according to the adjacency list generated in the previous operation. For example, a src vertex 1 is processed first, while a neighbor vertex set of 1 is N(1)={2, 3, 4}, and the corresponding tagged edges are 0, 1, and 0, respectively. For a dst vertex 2 of the src vertex 1, a neighbor vertex set is N(2)={3, 4}, and the corresponding tagged edges are 2 and 1, respectively. Both N(2) and N(1) contain common vertexes 3 and 4, and thus two triangles [1, 2, 3] and [1, 2, 4] may be identified. According to the meaning of each tagged edge in (tag1, tag2, tag3) in FIG. 8, the corresponding tagged edge sequences are (0, 1, 2) and (0, 0, 1), respectively. Next continue to identify a triangle on a dst vertex 3 of the src vertex 1. For the dst vertex 3, a neighbor vertex set is N(3)={4, 5}, and the corresponding tagged edges are 0 and 2, respectively. Both N(3) and N(1) contain a common vertex 4. Therefore, a triangle [1, 3, 4] may be identified, and the corresponding tagged edge sequence is (1, 0, 0). By analogy, after all neighbor vertexes in the neighbor vertex set of the vertex 1 are traversed, other src vertexes in the adjacency list are then processed in the same manner.

A part (h) in FIG. 11) is to correspond, according to a quantity of the tagged edge which is 2 in the corresponding tagged edge sequence, the triangle found in the previous operation to one of the four branches of the triangle category index, then match the tagged edge sequence with an edge direction sequence under the branch, and determine a category of the triangle according to a matching result.

Parameter Server is a hyper-scale parameter server for distributed storage or updating of parameters in the field of machine learning. Angel is a high-performance distributed machine learning platform developed based on the concept of parameter server. Spark is a fast and universal computing engine designed for large-scale data processing. Spark on Angel is a high-performance distributed computing platform that combines powerful parameter server functions of Angel with large-scale data processing capabilities of Spark.

In an embodiment, a triangle count processing process on the directed graph may be scaled into distributed computing logic, and the computer device may implement triangle unearthing in hyper-scale graph structure data on Spark on Angel. For relationship data between some vertexes stored on each distributed computing server, since operations before the generation of the adjacency list are all simple data preprocessing operations, the distributed computing server may use Spark by itself for processing to obtain the adjacency list. After generating the adjacency list, the distributed computing server pushes the adjacency list of each vertex onto the parameter server. When identifying and determining the triangle, the distributed computing server needs to pull the neighbor vertex set of the corresponding dst vertexes when processing local src vertexes, and additionally, the distributed computing server each pulls the neighbor vertex set of the corresponding dst vertexes from the parameter server, thereby completing the search and identification of the triangle.

Figure 12:
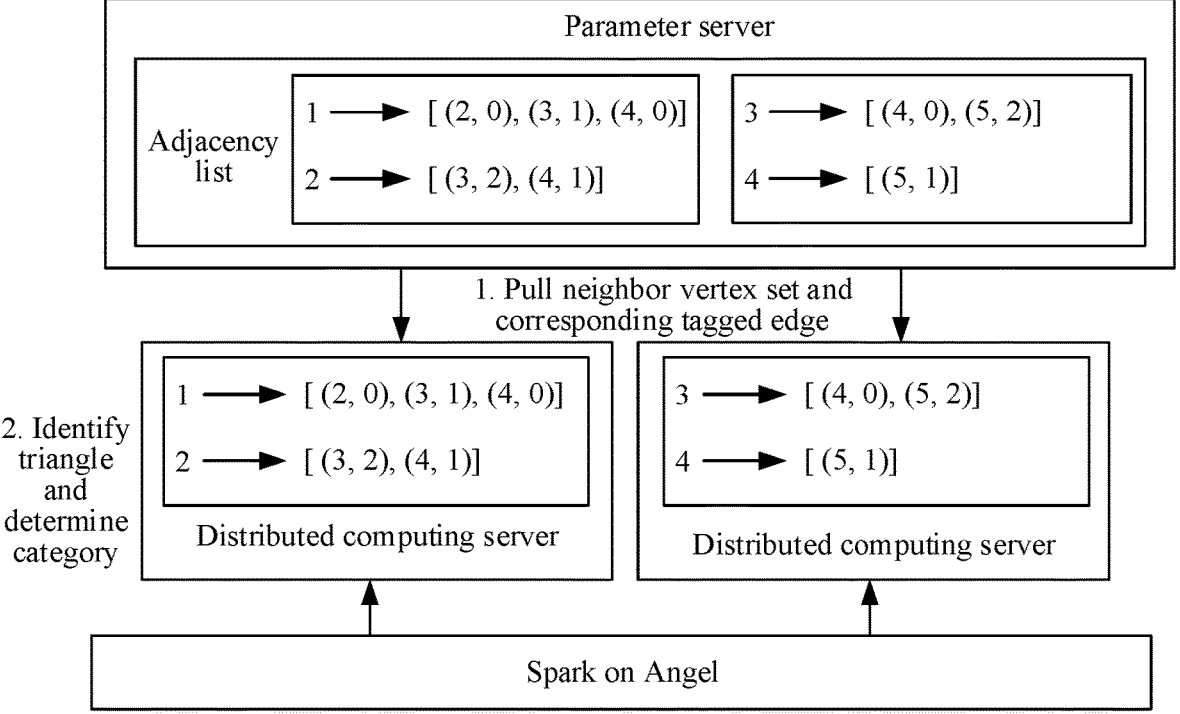
FIG. 12 is a schematic diagram of a process of processing graph data in a distributed manner, according to an embodiment.

As shown in FIG. 12, after each distributed computing server pushes the neighbor vertex set of each vertex to the parameter server, when processing the respective dst vertex, first, a neighbor vertex set and a tagged edge corresponding to the dst vertex are pulled from the parameter server. For example, a distributed computing server 1 needs to pull a neighbor vertex set of vertexes 2, 3, and 4 from the parameter server when processing a vertex 1, and needs to obtain a neighbor vertex set of the vertexes 3 and 4 when processing the vertex 2, without repeating the pull. A distributed computing server 2 needs to pull a neighbor vertex set of vertexes 4 and 5 when processing the vertex 3, and needs to obtain a neighbor vertex set of the vertex 5 when processing the vertex 4, without repeating the pull. The triangle and triangle category may then be determined according to the neighbor vertex set of the dst vertex obtained by pulling.

In addition, when the scale of the directed graph is excessively large, there will be too many dst vertexes corresponding to the src vertex processed by each distributed computing server. If the neighbor vertexes of all dst vertexes on the entire distributed computing server are pulled at once, low communication efficiency is caused due to too much traffic, thus affecting the performance. Additionally, the dst vertexes on the distributed computing server may be processed in batches, only a part is processed at a time, that is, the dst vertexes are pulled a plurality of times, so that the amount of data pulled every time can be reduced, and the communication and storage expenses can be reduced.

FIG. 13 is a schematic flowchart of a graph data processing method according to a specific embodiment. Referring to FIG. 13, the method includes the following operations:

Operation 1302: Acquire a directed graph, a directed edge in the directed graph being represented as pointing to a destination vertex from a start vertex.

Operation 1304: Traverse the directed edges in the directed graph, and in a case that a start vertex at which the traversed directed edge is located is greater than a destination vertex, represent the directed edge as pointing to the start vertex from the destination vertex, and tag an edge direction pointing to the start vertex from the destination vertex as a first value.

Operation 1306: Tag an edge direction pointing to the destination vertex from the start vertex as a second value in a case that the start vertex at which the directed edge is located is less than the destination vertex.

Operation 1308: For each vertex in the tagged directed graph, aggregate neighbor vertexes pointed to by each vertex, and obtain a neighbor vertex set corresponding to each vertex.

Operation 1310: Replace a tagged edge of a directed edge between the vertex and the neighbor vertex with a third value in a case that there is a neighbor vertex whose tagged edge is both a first value and a second value in the neighbor vertex set, the third value being used for representing that the directed edge between the vertex and the neighbor vertex is a two-way edge.

Operation 1312: Generate, according to tagged edges between the vertexes and neighbor vertexes in the corresponding neighbor vertex set, an adjacency list carrying the tagged edges and corresponding to the vertexes.

Operation 1314: Traverse the vertexes in the adjacency list.

Operation 1316: Determine a first neighbor vertex set to which the current traversed vertexes point.

Operation 1318: Traverse neighbor vertexes in the first neighbor vertex set.

Operation 1320: Determine a second neighbor vertex set to which the current traversed neighbor vertexes point.

Operation 1322: Determine common vertexes in the first neighbor vertex set and the second neighbor vertex set.

Operation 1324: Determine a triangle according to the current traversed vertex, the current traversed neighbor vertex, and the common vertex.

Operation 1326: Arrange a tagged edge between the current traversed vertex and the current traversed neighbor vertex, a tagged edge between the current traversed vertex and the common vertex, and a tagged edge between the current traversed neighbor vertex and the common vertex in sequence, and obtain a tagged edge sequence.

Operation 1328: Determine a quantity of tagged edges representing that the directed edge is a two-way edge in the tagged edge sequence.

Operation 1330: Acquire a category index of the triangle, the category index being generated according to a correspondence between edge direction sequences of three directed edges constituting the triangle and the category.

Operation 1332: Match the tagged edge sequence with edge direction sequences corresponding to the quantity in the category index of the triangle.

Operation 1334: Determine the category of the triangle constituted by the current traversed vertex, the neighbor vertex, and the common vertex according to the matched edge direction sequence.

Operation 1336: Generate, according to a quantity of different categories of triangles in which the current traversed vertex is located, a feature vector corresponding to a user identifier represented by the current traversed vertex.

Operation 1338: Classify the user identifier represented by the vertex according to the feature vector.

In the above graph data processing method, the directed edge of the directed graph is represented in a unified form, in an original representation form of pointing to the destination vertex from the start vertex, and according to a specified order between the vertex identifiers of the start vertex and the destination vertex. As a result, when subsequently counting the quantity of the triangles, there will be no case that a same triangle is found a plurality of times, thereby avoiding redundant calculation of the triangles, saving computing resources, running faster, and consuming less computing resources. In particular, a computing pressure brought by a super vertex with many neighbors can be greatly relieved, while the correctness of calculation is ensured. Additionally, for a re-represented directed edge, an original edge direction of the directed edge is further recorded by a tagged edge, so that a triangle can be determined in the tagged directed graph and a category of the triangle can be identified, which implements the identification of the triangle category caused by the directionality of edges in the directed graph.

It is to be understood that, although the operations in the flowcharts of FIG. 2, FIG. 10, and FIG. 13 are sequentially displayed according to indication of arrows, the operations are not necessarily sequentially performed in the sequence indicated by the arrows. Unless clearly specified in this specification, there is no strict sequence limitation on the execution of the operations, and the operations may be performed in another sequence. Moreover, at least some operations in FIG. 2, FIG. 10, and FIG. 13 may include a plurality of operations or a plurality of stages. These operations or the stages are not necessarily performed at the same moment, but may be performed at different moments. The operations or the stages are not necessarily performed in sequence, but may be performed in turn or alternately with another operation or at least some of operations or stages of the another operation.

Figure 14:
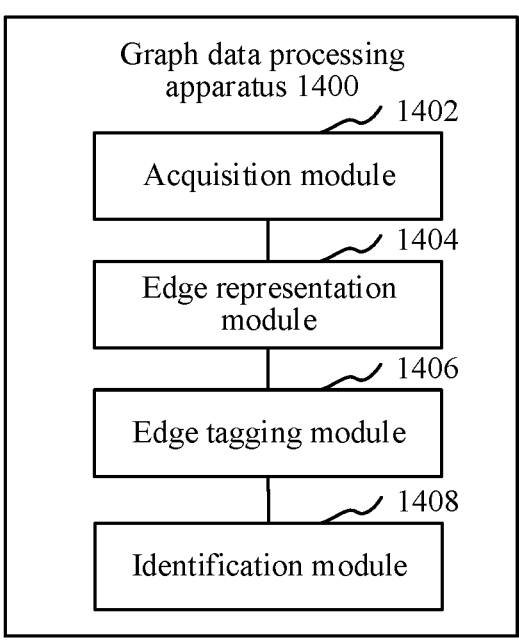
FIG. 14 is a structural block diagram of a graph data processing apparatus, according to an embodiment.

In an embodiment shown in FIG. 14, a graph data processing apparatus 1400 is provided. The apparatus may adopt a software module or a hardware module, or a combination of the two to become a part of the computer device. The apparatus specifically includes: an acquisition module 1402, an edge representation module 1404, an edge tagging module 1406, and an identification module 1408, where:

the acquisition module 1402, configured to acquire a directed graph, a directed edge in the directed graph being represented as pointing to a destination vertex from a start vertex;

the edge representation module 1404, configured to represent the directed edge in a unified form according to a specified order between a vertex identifier of the start vertex and a vertex identifier of the destination vertex;

the edge tagging module 1406, configured to generate a tagged edge for recording an original edge direction of the directed edge, and obtain a tagged directed graph; and the identification module 1408, configured to identify, based on tagged edges between any two of a vertex in the tagged directed graph, a neighbor vertex of the vertex, and a common vertex commonly adjacent to the vertex and the neighbor vertex, a category of a triangle constituted by the vertex, the neighbor vertex, and the common vertex, the identified category of the triangle being used for generating a feature vector of the vertex.

In an embodiment, the acquisition module 1402 is further configured to acquire a payment record corresponding to user identifiers; obtain payment interaction data between the user identifiers according to the payment record; and generate a directed payment network graph according to the payment interaction data, a vertex of the payment network graph representing the user identifier, and a directed edge between two vertexes in the payment network graph representing that there is a one-way or two-way payment interaction event between corresponding two user identifiers.

In an embodiment, the acquisition module 1402 is further configured to acquire a contact list corresponding to user identifiers in a community network; obtain contact relationship data between the user identifiers according to the contact list; and generate a directed community network graph according to the contact relationship data, a vertex in the community network graph representing the user identifier, and a directed edge between two vertexes in the community network graph representing that there is a one-way or two-way contact relationship between corresponding two user identifiers.

In an embodiment, the edge representation module 1404 is configured to represent the directed edge as pointing to the start vertex from the destination vertex in a case that the start vertex at which the directed edge is located is greater than the destination vertex. The edge tagging module 1406 is configured to tag an edge direction pointing to the start vertex from the destination vertex as a first value.

In an embodiment, the edge tagging module 1406 is configured to tag an edge direction pointing to the destination vertex from the start vertex as a second value in a case that the start vertex at which the directed edge is located is less than the destination vertex.

In an embodiment, the edge representation module 1404 is configured to represent the directed edge as pointing to the start vertex from the destination vertex in a case that the start vertex at which the directed edge is located is less than the destination vertex. The edge tagging module 1406 is configured to tag an edge direction pointing to the start vertex from the destination vertex as a first value.

In an embodiment, the edge tagging module 1406 is configured to tag an edge direction pointing to the destination vertex from the start vertex as a second value in a case that the start vertex at which the directed edge is located is greater than the destination vertex.

In an embodiment, the graph data processing apparatus 1400 further includes an aggregation module configured to, for each vertex in the tagged directed graph, aggregate neighbor vertexes to which the vertexes point, and obtain a neighbor vertex set corresponding to the vertexes; and generate, according to tagged edges between the vertexes and neighbor vertexes in the corresponding neighbor vertex set, an adjacency list carrying the tagged edges and corresponding to the vertexes.

In an embodiment, the edge tagging module 1406 is configured to replace a tagged edge of a directed edge between the vertex and the neighbor vertex with a third value in a case that there is a neighbor vertex whose tagged edge is both a first value and a second value in the neighbor vertex set, the third value being used for representing that the directed edge between the vertex and the neighbor vertex is a two-way edge.

In an embodiment, the graph data processing apparatus 1400 further includes a category index generation module, configured to acquire edge directions of three directed edges constituting a triangle and a category of the triangle; arrange the three edge directions in sequence to obtain an edge direction sequence of the triangle; and store the edge direction sequence and the category of the triangle in a corresponding manner, and generate a category index of the triangle.

In an embodiment, the category index generation module is configured to determine, according to the edge direction sequence, a quantity of two-way edges in the three directed edges constituting the triangle; and store the quantity, the edge direction sequence, and the category of the triangle in a corresponding manner, and generate a category index of the triangle.

In an embodiment, the identification module 1408 is configured to traverse the vertexes in the tagged directed graph; determine a first neighbor vertex set to which current traversed vertexes point, a second neighbor vertex set to which neighbor vertexes in the first neighbor vertex set point, and common vertexes of the first neighbor vertex set and the second neighbor vertex set; and identify, based on tagged edges between the current traversed vertex, the neighbor vertex, and the common vertex, a category of a triangle constituted by the current traversed vertex, the neighbor vertex, and the common vertex.

In an embodiment, the identification module 1408 is configured to arrange a tagged edge between the current traversed vertex and the neighbor vertex, a tagged edge between the current traversed vertex and the common vertex, and a tagged edge between the neighbor vertex and the common vertex in sequence, and obtain a tagged edge sequence; and match the tagged edge sequence with the edge direction sequences in the category index of the triangle, and obtain the category of the triangle constituted by the current traversed vertex, the neighbor vertex, and the common vertex.

In an embodiment, the identification module 1408 is configured to determine a quantity of tagged edges representing that the directed edge is a two-way edge in the tagged edge sequence; and match the tagged edge sequence with edge direction sequences corresponding to the quantity in the category index of the triangle, and determine the category of the triangle constituted by the current traversed vertex, the neighbor vertex, and the common vertex according to the matched edge direction sequence.

In an embodiment, the directed graph is a community network graph, a vertex in the community network graph represents a user identifier in a community network, a directed edge in the community network graph represents that there is a social relationship between a user identifier corresponding to the start vertex and a user identifier corresponding to the destination vertex. The graph data processing apparatus 1400 further includes a vector generation module and a sub-network unearthing module. The vector generation module is configured to generate, according to a quantity of different categories of triangles in which the respective vertexes are located in the community network graph, a feature vector corresponding to the user identifier represented by the vertex. The sub-network unearthing module is configured to determine, according to the feature vector corresponding to the user identifier, a community sub-network graph formed by user identifiers having a similarity degree greater than a threshold from the community network graph; and determine a community sub-network from the community network based on the community sub-network graph.

The graph data processing apparatus 1400 represents the directed edge of the directed graph in a unified form, in an original representation form of pointing to the destination vertex from the start vertex, and according to a specified order between the vertex identifiers of the start vertex and the destination vertex. As a result, when subsequently counting the quantity of the triangles, there will be no case that a same triangle is found a plurality of times, thereby avoiding redundant calculation of the triangles, saving computing resources, running faster, and consuming less computing resources. In particular, a computing pressure brought by a super vertex with many neighbors can be greatly relieved, while the correctness of calculation is ensured. Additionally, for a re-represented directed edge, an original edge direction of the directed edge is further recorded by a tagged edge, so that a triangle can be determined in the tagged directed graph and a category of the triangle can be identified, which implements the identification of the triangle category caused by the directionality of edges in the directed graph.

For a specific limitation on the graph data processing apparatus 1400, refer to the limitation on the graph data processing method above. Details are not described herein again. All or some of the modules included in the graph data processing apparatus 1400 may be implemented by software, hardware, or a combination thereof. The modules may be built in or independent of a processor of a computer device in a hardware form, or may be stored in a memory of the computer device in a software form, so that the processor invokes and performs an operation corresponding to each of the modules.

In an embodiment, a computer device is provided. The computer device may be a server, and an internal structure diagram thereof may be shown in FIG. 15. The computer device includes a processor, a memory, and a network interface that are connected through a system bus. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. The network interface of the computer device is configured to communicate with an external computer device through a network connection. The computer-readable instructions, when executed by the processor, implement a graph data processing method.

Figure 15:
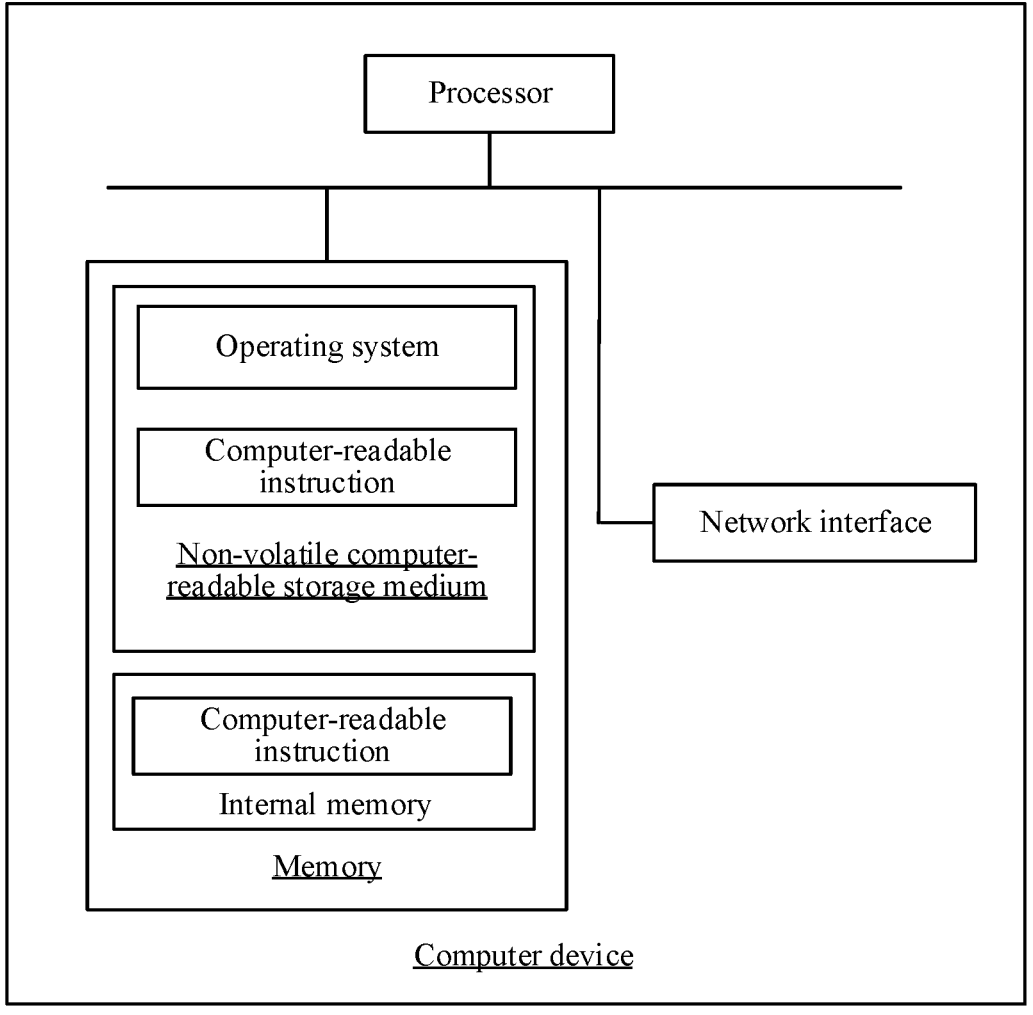
FIG. 15 is an internal structural diagram of a computer device, according to an embodiment.

A person skilled in the art would understand that the structure shown in FIG. 15 is only a block diagram of a part of a structure related to a solution of the disclosure and does not limit the computer device to which the solution of the disclosure is applied. Specifically, the computer device may include more or fewer components than those in the drawings, or include a combination of some components, or include different component layouts.

In an embodiment, a computer device is provided, including a memory and a processor, the memory storing computer-readable instructions, the processor, when executing the computer-readable instructions, implementing the operations in the foregoing method embodiments.

In an embodiment, a computer-readable storage medium is provided, storing computer-readable instructions, the computer-readable instructions, when executed by a processor, implementing the operations in the foregoing method embodiments.

In an embodiment, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the operations in the method embodiments.

A person of ordinary skill in the art would understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided in the disclosure may include at least one of a non-volatile memory and a volatile memory. The non-volatile memory may include a read-only memory (Read-Only Memory, ROM), a magnetic tape, a floppy disk, a flash memory, an optical memory, and the like. The volatile memory may include a random access memory (Random Access Memory, RAM) or an external cache. For the purpose of description instead of limitation, the RAM is available in a plurality of forms, such as a static RAM (Static Random Access Memory, SRAM) or a dynamic RAM (Dynamic Random Access Memory, DRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of the disclosure, which are described specifically and in detail, but cannot be construed as a limitation to the patent scope of the disclosure. For a person of ordinary skill in the art, several transformations and improvements can be made without departing from the idea of the disclosure. These transformations and improvements belong to the protection scope of the disclosure. Therefore, the protection scope of the patent of the disclosure shall be subject to the appended claims.

What is claimed is:

1. A graph data processing method, performed by at least one processor, the method comprising:
   acquiring relationship data formed when terminals interact through an application server, the relationship data representing interactions between user identifiers in a network system;
   generating a directed graph from the relationship data, wherein a vertex in the directed graph represents a user identifier, and a directed edge in the directed graph represents a directional relationship between user identifiers corresponding to a start vertex and a destination vertex;
   re-representing the directed edge in a unified form that is different from a form of the directed graph as obtained, in a data structure comprising a matrix or a list, according to a specified order between a vertex identifier of the start vertex and a vertex identifier of the destination vertex, wherein the specified order is determined independently from a traversal order of the directed graph;
   recording, in the data structure, a tagged edge indicating an original edge direction of the directed edge prior to re-representing the directed edge in the unified form based on the original edge direction being different than an edge direction of the re-represented directed edge, to obtain a tagged directed graph, wherein a tag of the tagged edge indicates which first vertex from among vertices in the acquired directed graph corresponds to the start vertex and which second vertex from among the vertices in the acquired directed graph corresponds to the destination vertex; and
   identifying a category of a triangle constituted by a vertex in the tagged directed graph, a neighbor vertex of the vertex, and a common vertex commonly adjacent to the vertex and the neighbor vertex, based on tagged edges between two of the vertex, the neighbor vertex, and the common vertex, the identified category of the triangle being used for generating a feature vector of the vertex,
   wherein the identified category of the triangle is configured for generating a feature vector of the vertex for application to pattern identification tasks including identifying abnormal network activities or discovering network communities.

2. The method according to claim 1, wherein the acquiring of the directed graph comprises:
   acquiring a payment record corresponding to user identifiers;
   obtaining payment interaction data between the user identifiers according to the payment record; and
   generating a directed payment network graph according to the payment interaction data as the directed graph, a vertex of the directed payment network graph representing a user identifier, a directed edge between two vertexes in the directed payment network graph representing that there is a one-way or two-way payment interaction event between corresponding two user identifiers.

3. The method according to claim 1, wherein the acquiring of the directed graph comprises:
   acquiring a contact list corresponding to user identifiers in a community network;
   obtaining contact relationship data between the user identifiers according to the contact list; and generating a directed community network graph according to the contact relationship data as the directed graph, a vertex in the directed community network graph representing a user identifier, a directed edge between two vertexes in the directed community network graph representing that there is a one-way or two-way contact relationship between corresponding two user identifiers.

4. The method according to claim 1, wherein the representing of the directed edge in the unified form comprises representing the directed edge as pointing to the start vertex from the destination vertex based on the start vertex at which the directed edge is located being a larger vertex and the destination vertex being a smaller vertex; and wherein the generating of the tagged edge comprises tagging an edge direction pointing to the start vertex from the destination vertex as a first value.

5. The method according to claim 4, wherein the representing of the directed edge as pointing to the larger vertex from the smaller vertex comprises tagging an edge direction pointing to the destination vertex from the start vertex as a second value in a case that the start vertex at which the directed edge is located is less than the destination vertex.

6. The method according to claim 1, wherein the representing of the directed edge in the unified form comprises representing the directed edge as pointing to the start vertex from the destination vertex based on the start vertex at which the directed edge is located being less than the destination vertex; and the generating of the tagged edge comprises tagging an edge direction pointing to the start vertex from the destination vertex as a first value.

7. The method according to claim 6, wherein the generating of the tagged edge further comprises tagging an edge direction pointing to the destination vertex from the start vertex as a second value based on the start vertex at which the directed edge is located being greater than the destination vertex.

8. The method according to claim 1, further comprising:

for each vertex in the tagged directed graph, aggregating neighbor vertexes to which the vertex points, to obtain a neighbor vertex set corresponding to the vertex; and generating, according to tagged edges between the vertexes and neighbor vertexes in the corresponding neighbor vertex set, an adjacency list carrying the tagged edges and corresponding to the vertexes.

9. The method according to claim 8, further comprising:

replacing a tagged edge of a directed edge between the vertex and the neighbor vertex with a third value based on there being a neighbor vertex whose tagged edge is both a first value and a second value in the neighbor vertex set, the third value being used for representing that the directed edge between the vertex and the neighbor vertex is a two-way edge.

10. The method according to claim 1, further comprising:

acquiring edge directions of three directed edges constituting a triangle and the category of the triangle;

arranging the three directed edges in sequence to obtain an edge direction sequence of the triangle; and storing the edge direction sequence and the category of the triangle in a corresponding manner to generate a category index of the triangle.

11. The method according to claim 10, wherein the storing of the edge direction sequence and the category of the triangle in the corresponding manner comprises:

determining, according to the edge direction sequence, a quantity of two-way edges in the three directed edges constituting the triangle; and storing the quantity of two-way edges, the edge direction sequence, and the category of the triangle in the corresponding manner to generate the category index of the triangle.

12. The method according to claim 1, wherein the identifying of the category of the triangle comprises:

traversing the vertexes of the triangle in the tagged directed graph;

determining a first neighbor vertex set to which a current traversed vertex points, a second neighbor vertex set to which neighbor vertexes in the first neighbor vertex set point, and common vertexes of the first neighbor vertex set and the second neighbor vertex set; and identifying, based on tagged edges between the current traversed vertex, the neighbor vertex, and the common vertex, a category of a triangle constituted by the current traversed vertex, the neighbor vertex, and the common vertex.

13. The method according to claim 12, wherein the identifying of the category of the triangle further comprises:

arranging a tagged edge between the current traversed vertex and the neighbor vertex, a tagged edge between the current traversed vertex and the common vertex, and a tagged edge between the neighbor vertex and the common vertex in sequence, to obtain a tagged edge sequence; and matching the tagged edge sequence with edge direction sequences in a category index of the triangle, to obtain the category of the triangle.

14. The method according to claim 13, wherein the matching of the tagged edge sequence with the edge direction sequences comprises:

determining a quantity of tagged edges representing that the directed edge is a two-way edge in the tagged edge sequence; and matching the tagged edge sequence with edge direction sequences, in the category index of the triangle, corresponding to the quantity of tagged edges, to determine the category of the triangle according to the matched edge direction sequence.

15. The method according to claim 1, wherein the directed graph is a community network graph, a vertex in the community network graph represents a user identifier in a community network, a directed edge in the community network graph represents that there is a social relationship between a user identifier corresponding to the start vertex and a user identifier corresponding to the destination vertex, and the method further comprises:

generating, according to a quantity of different categories of triangles in which the respective vertexes are located in the community network graph, a feature vector corresponding to the user identifier represented by the vertex;

determining, according to the feature vector corresponding to the user identifier, a community sub-network graph formed by user identifiers having a similarity degree greater than a threshold from the community network graph; and determining a community sub-network from the community network based on the community sub-network graph.

16. A graph data processing apparatus, comprising:

at least one memory configured to store computer program code; and at least one processor configured to operate as instructed by the computer program code, the computer program code including:

acquisition code configured to cause the at least one processor to acquire relationship data formed when terminals interact through an application server, the relationship data representing interactions between user identifiers in a network system;

generation code configured to cause the at least one processor to generate a directed graph from the relationship data, wherein a vertex in the directed graph represents a user identifier, and a directed edge in the directed graph represents a directional relationship between user identifiers corresponding to a start vertex and a destination vertex;

edge representation code configured to cause the at least one processor to re-represent the directed edge in a unified form that is different from a form of the directed graph as obtained, in a data structure comprising a matrix or a list, according to a specified order between a vertex identifier of the start vertex and a vertex identifier of the destination vertex, wherein the specified order is determined independently from a traversal order of the directed graph;

edge tagging code configured to cause the at least one processor to record, in the data structure, a tagged edge indicating an original edge direction of the directed edge prior to re-representing the directed edge in the unified form based on the original edge direction being different than an edge direction of the re-represented directed edge, to obtain a tagged directed graph, wherein a tag of the tagged edge indicates which first vertex from among vertices in the acquired directed graph corresponds to the start vertex and which second vertex from among the vertices in the acquired directed graph corresponds to the destination vertex; and identification code configured to cause the at least one processor to identify a category of a triangle constituted by a vertex in the tagged directed graph, a neighbor vertex of the vertex, and a common vertex commonly adjacent to the vertex and the neighbor vertex, based on tagged edges between two of the vertex, the neighbor vertex, and the common vertex, the identified category of the triangle being used for generating a feature vector of the vertex, wherein the identified category of the triangle is configured for generating a feature vector of the vertex for application to pattern identification tasks including identifying abnormal network activities or discovering network communities.

17. The graph data processing apparatus according to claim 16, wherein the identification code is further configured to cause the at least one processor to:

traverse the vertexes in the tagged directed graph;

determine a first neighbor vertex set to which a current traversed vertex points, a second neighbor vertex set to which neighbor vertexes in the first neighbor vertex set point, and common vertexes of the first neighbor vertex set and the second neighbor vertex set; and identify, based on tagged edges between the current traversed vertex, the neighbor vertex, and the common vertex, a category of a triangle constituted by the current traversed vertex, the neighbor vertex, and the common vertex.

18. The graph data processing apparatus according to claim 17, wherein the identification code is further configured to cause the at least one processor to:

arrange a tagged edge between the current traversed vertex and the neighbor vertex, a tagged edge between the current traversed vertex and the common vertex, and a tagged edge between the neighbor vertex and the common vertex in sequence, to obtain a tagged edge sequence; and match the tagged edge sequence with edge direction sequences in a category index of the triangle, to obtain the category of the triangle.

19. At least one non-transitory computer-readable storage medium, storing computer-readable instructions that, when executed by at least one processor, cause the at least one processor to:

acquire relationship data formed when terminals interact through an application server, the relationship data representing interactions between user identifiers in a network system;

generate a directed graph from the relationship data, wherein a vertex in the directed graph represents a user identifier, and a directed edge in the directed graph represents a directional relationship between user identifiers corresponding to a start vertex and a destination vertex;

acquire a directed graph, a directed edge in the directed graph being represented as pointing to a destination vertex from a start vertex;

re-representing the directed edge in a unified form that is different from a form of the directed graph as obtained, in a data structure comprising a matrix or a list, according to a specified order between a vertex identifier of the start vertex and a vertex identifier of the destination vertex, wherein the specified order is determined independently from a traversal order of the directed graph;

recording, in the data structure, a tagged edge indicating an original edge direction of the directed edge prior to re-representing the directed edge in the unified form based on the original edge direction being different than an edge direction of the re-represented directed edge, to obtain a tagged directed graph, wherein a tag of the tagged edge indicates which first vertex from among vertices in the acquired directed graph corresponds to the start vertex and which second vertex from among the vertices in the acquired directed graph corresponds to the destination vertex; and identify a category of a triangle constituted by a vertex in the tagged directed graph, a neighbor vertex of the vertex, and a common vertex commonly adjacent to the vertex and the neighbor vertex, based on tagged edges between two of the vertex, the neighbor vertex, and the common vertex, the identified category of the triangle being used for generating a feature vector of the vertex, wherein the identified category of the triangle is configured for generating a feature vector of the vertex for application to pattern identification tasks including identifying abnormal network activities or discovering network communities.

20. The at least one non-transitory computer-readable storage medium of claim 19, wherein the computer-readable instructions further cause the at least one processor to:

traverse the vertexes in the tagged directed graph;

determine a first neighbor vertex set to which a current traversed vertex points, a second neighbor vertex set to which neighbor vertexes in the first neighbor vertex set point, and common vertexes of the first neighbor vertex set and the second neighbor vertex set; and identify, based on tagged edges between the current traversed vertex, the neighbor vertex, and the common vertex, a category of a triangle constituted by the current traversed vertex, the neighbor vertex, and the common vertex.

* * * * *